United States Patent
Stayshich et al.

(10) Patent No.: US 11,746,283 B2
(45) Date of Patent: Sep. 5, 2023

(54) SILOLE AND GERMOLE FUSED RING PHOTOCHROMIC COMPOUNDS

(71) Applicant: Transitions Optical, Ltd., Tuam (IE)

(72) Inventors: Ryan Stayshich, Pittsburgh, PA (US); Robert W. Walters, Murrysville, PA (US)

(73) Assignee: Transitions Optical, Ltd., Tuam (IE)

( * ) Notice: Subject to any disclaimer, the term of this patent is extended or adjusted under 35 U.S.C. 154(b) by 683 days.

(21) Appl. No.: 16/622,033

(22) PCT Filed: Jun. 30, 2017

(86) PCT No.: PCT/EP2017/066260
§ 371 (c)(1),
(2) Date: Dec. 12, 2019

(87) PCT Pub. No.: WO2019/001724
PCT Pub. Date: Jan. 3, 2019

(65) Prior Publication Data
US 2020/0172798 A1    Jun. 4, 2020

(51) Int. Cl.
*C09K 9/02*     (2006.01)
*C07F 7/08*     (2006.01)
*G02C 7/10*     (2006.01)

(52) U.S. Cl.
CPC .............. *C09K 9/02* (2013.01); *C07F 7/0816* (2013.01); *C09K 2211/1018* (2013.01); *G02C 7/102* (2013.01)

(58) Field of Classification Search
CPC ........ C07F 7/0816; C07F 7/0814; C07F 7/30; C09K 2211/1007; C09K 2211/1018;
(Continued)

(56) References Cited

U.S. PATENT DOCUMENTS 5,625,427 A    4/1997    Araujo et al.
5,645,767 A    7/1997    Van Gemert
(Continued)

FOREIGN PATENT DOCUMENTS

EP    2360224 A1    8/2011
WO    9721698 A1    6/1997
(Continued)

OTHER PUBLICATIONS

Murai et al., "Rhodium-Catalyzed Dehydrogenative Germylation of C—H Bonds: New Entry to Unsymmetrically Functionalized 9-Germafluorenes", Organic Letters, 2014, pp. 6492-6495, vol. 16, No. 24.
(Continued)

*Primary Examiner* — Valerie Rodriguez-Garcia
(74) *Attorney, Agent, or Firm* — THE WEBB LAW FIRM

(57) ABSTRACT

The present invention relates to silole and germole fused ring photochromic compounds represented, with some embodiments, by the following Formula (Ia), (Ia) With reference to Formula (Ia): M includes Si or Ge; Ring A and Ring B each independently include aryl or heteroaryl; and the photochromic compound is a thermally reversible photochromic compound. The present invention also relates to
(Continued)

Scheme 1
(Part 3)

photochromic compositions and photochromic articles, such as photochromic ophthalmic articles that include one or more photochromic compounds represented, with some embodiments, by Formula (Ia).

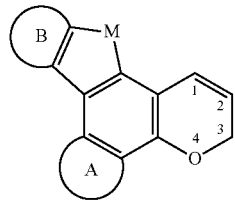

(Ia)

5 Claims, 3 Drawing Sheets

(58) Field of Classification Search
CPC .... C09K 2211/1088; C09K 2211/1096; C09K 9/02; G02B 1/04
See application file for complete search history.

(56) References Cited

U.S. PATENT DOCUMENTS

| | | | |
|---|---|---|---|
| 5,651,923 A | 7/1997 | Kumar et al. | |
| 5,955,520 A | 9/1999 | Heller et al. | |
| 6,113,814 A | 9/2000 | Gemert et al. | |
| 6,153,126 A | 11/2000 | Kumar | |
| 6,392,043 B1 | 5/2002 | Bourchteine et al. | |
| 6,555,028 B2 | 4/2003 | Walters et al. | |
| 6,690,495 B1 | 2/2004 | Kosa et al. | |
| 6,881,850 B2 | 4/2005 | Mann et al. | |
| 7,342,112 B2 | 3/2008 | Kumar et al. | |
| 8,211,338 B2 | 7/2012 | He et al. | |
| 8,518,546 B2 | 8/2013 | He et al. | |
| 8,545,984 B2 | 10/2013 | He et al. | |
| 8,698,117 B2 | 4/2014 | He et al. | |
| 8,933,220 B2 * | 1/2015 | Melzig | G02B 5/23 540/581 |
| 9,028,728 B2 | 5/2015 | Bancroft et al. | |
| 9,034,219 B2 | 5/2015 | He et al. | |
| 9,051,332 B1 | 6/2015 | He et al. | |
| 9,334,439 B2 | 5/2016 | DeMeio et al. | |
| 10,371,866 B2 | 8/2019 | Frease et al. | |
| 10,501,477 B2 | 12/2019 | Deng et al. | |
| 2006/0226402 A1 | 10/2006 | Kim et al. | |
| 2011/0140056 A1 | 6/2011 | He et al. | |
| 2015/0361332 A1 | 12/2015 | Yam et al. | |
| 2016/0200639 A1 | 7/2016 | Hartwig et al. | |
| 2018/0208781 A1 | 7/2018 | Haley et al. | |

FOREIGN PATENT DOCUMENTS

| | | |
|---|---|---|
| WO | 0002883 A2 | 1/2000 |
| WO | 2010065393 A1 | 6/2010 |
| WO | 2012082299 A1 | 6/2012 |
| WO | 2012082381 A1 | 6/2012 |
| WO | 2012082383 A1 | 6/2012 |
| WO | 2012082506 A1 | 6/2012 |
| WO | 2013086248 A1 | 6/2013 |
| WO | 2015077264 A1 | 5/2015 |
| WO | 2016142496 A1 | 9/2016 |
| WO | 2016144324 A1 | 9/2016 |
| WO | 2017030545 A1 | 2/2017 |

OTHER PUBLICATIONS

Ureshino et al., "Rhodium-Catalyzed Synthesis of Silafluorene Derivatives via Cleavage of Silicon-Hydrogen and Carbon-Hydrogen Bonds", Journal of the American Chemical Society, 2010, pp. 14324-14326, vol. 132, No. 41.

* cited by examiner

Scheme 1
(Part 1)

Scheme 1
(Part 2)

Scheme 1
(Part 3)

SILOLE AND GERMOLE FUSED RING PHOTOCHROMIC COMPOUNDS

CROSS-REFERENCE TO RELATED APPLICATION

This application is the United States national phase of International Application No. PCT/EP2017/066260 filed Jun. 30, 2017, the disclosure of which is hereby incorporated by reference in its entirety.

FIELD

The present invention relates to fused ring photochromic compounds that include silole or germole rings, such as photochromic benzosilole naphthopyran compounds and photochromic benzogermole naphthopyran compounds, and photochromic compositions and photochromic articles that include such compounds.

BACKGROUND

Photochromic compounds and materials, in response to certain wavelengths of electromagnetic radiation (or "actinic radiation"), typically undergo a transformation from one form or state to another form, with each form having a characteristic or distinguishable absorption spectrum associated therewith. Typically, upon exposure to actinic radiation, many photochromic materials are transformed from a closed-form, which corresponds to an unactivated (or bleached, or substantially colorless) state of the photochromic material, to an open-form, which corresponds to an activated (or colored) state of the photochromic material. In the absence of exposure to actinic radiation, such photochromic materials are reversibly transformed from the activated (or colored) state, back to the unactivated (or bleached) state. Compositions and articles, such as eyewear lenses, that contain photochromic materials or have photochromic materials applied thereto (such as in form of a photochromic coating composition) typically display colorless (or clear) and colored states that correspond to the colorless and colored states of the photochromic materials contained therein and/or applied thereto.

Photochromic compounds can provide a combination of both photochromic and dichroic properties when exposed to actinic radiation and properly aligned together, such as when including one or more lengthening groups covalently bonded thereto. Dichroic properties relate to the ability of the photochromic-dichroic compounds to linearly polarize incident unpolarized light.

Photochromic compounds and materials are typically characterized with regard to various properties, such as photochromic properties, which include, but are not limited to: fade rate; change in optical density (sometimes designated as ΔOD); the change in optical density (ΔOD) at saturation; sensitivity (sometimes designated as ΔOD/Min); the efficiency at which the photochromic compound absorbs radiation required to activate the photochromic compound (sometimes designated as chromaticity); and dichroic properties (such as in the case of photochromic-dichroic compounds), which can be quantified with regard to absorption ratio (AR) values.

It would be desirable to develop new photochromic compounds. It would be further desirable that such newly developed photochromic compounds possess properties, such as photochromic properties and optionally dichroic properties, that are at least the same as or better than those of existing photochromic compounds.

SUMMARY

In accordance with the present invention, there is provided a photochromic compound having a core fused ring structure represented by the following Formula (Ia),

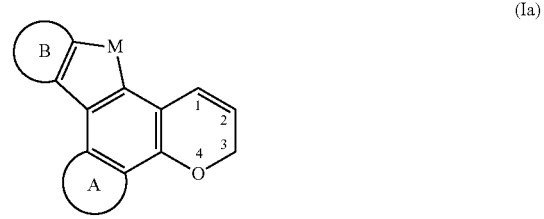

(Ia)

With reference to Formula (Ia): M comprises Si or Ge; Ring A and Ring B each independently comprise aryl or heteroaryl; and the photochromic compound is a thermally reversible photochromic compound.

The features that characterize the present invention are pointed out with particularity in the claims, which are annexed to and form a part of this disclosure. These and other features of the invention, its operating advantages and the specific objects obtained by its use will be more fully understood from the following detailed description in which non-limiting embodiments of the invention are illustrated and described.

BRIEF DESCRIPTION OF THE DRAWINGS

In FIGS. 1(a) through 1(c), like characters refer to the same compounds and/or reactants, as the case may be, unless otherwise stated.

DETAILED DESCRIPTION

Figure 1A:
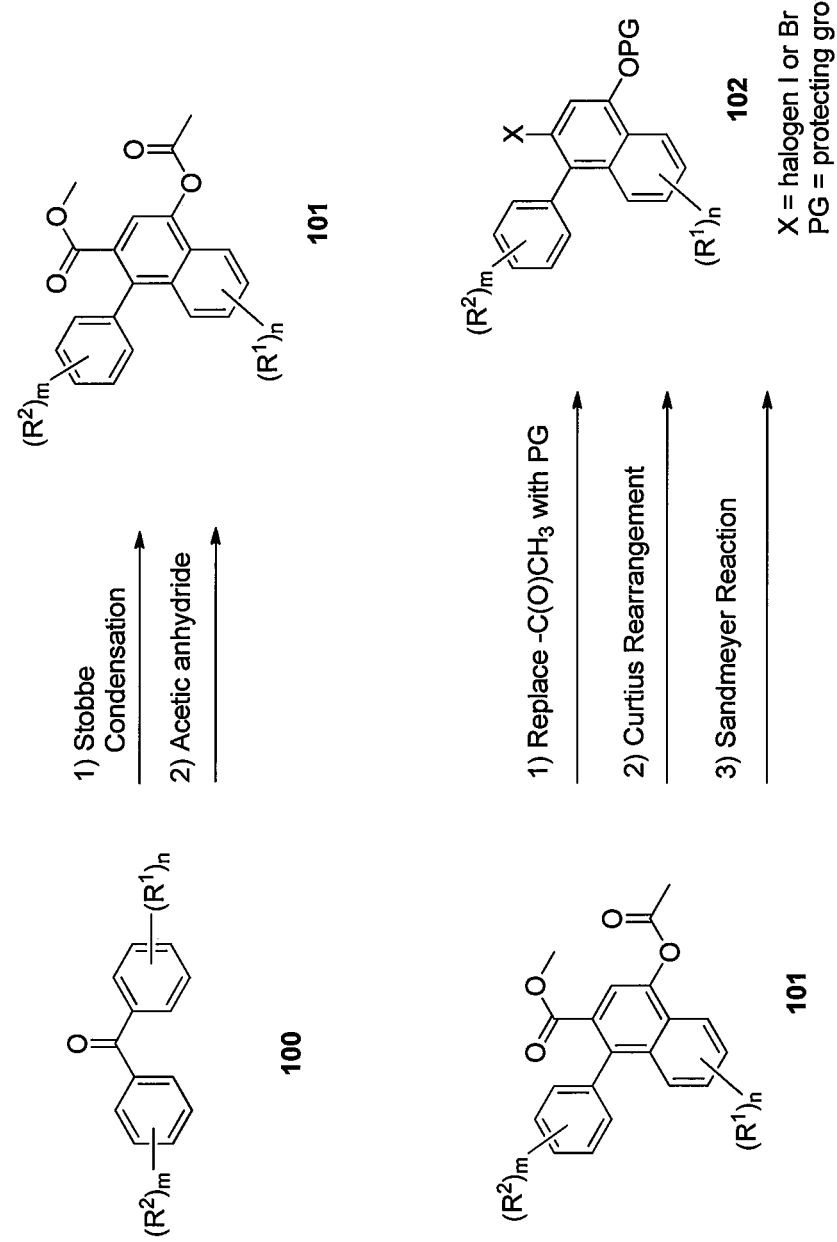
FIG. 1(a) is an illustrative representative first part (Part 1) of a general scheme, Scheme 1, of a method for preparing photochromic compounds according to some embodiments of the present invention, such as represented by Formula (IIb), as described further herein.

As used herein, the articles "a," "an," and "the" include plural referents unless otherwise expressly and unequivocally limited to one referent.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

As used herein, unless otherwise indicated, left-to-right representations of linking groups, such as divalent linking groups, are inclusive of other appropriate orientations, such as, but not limited to, right-to-left orientations. For purposes of non-limiting illustration, the left-to-right representation of the divalent linking group

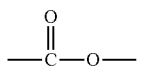

or equivalently —C(O)O—, is inclusive of the right-to-left representation thereof,

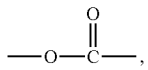

or equivalently —O(O)C— or —OC(O)—.

Other than in the operating examples, or where otherwise indicated, all numbers expressing quantities of ingredients, reaction conditions, and so forth used in the specification and claims are to be understood as modified in all instances by the term "about."

As used herein, molecular weight values of polymers, such as weight average molecular weights (Mw) and number average molecular weights (Mn), are determined by gel permeation chromatography using appropriate standards, such as polystyrene standards.

As used herein, polydispersity index (PDI) values represent a ratio of the weight average molecular weight (Mw) to the number average molecular weight (Mn) of the polymer (i.e., Mw/Mn).

As used herein, the term "polymer" means homopolymers (e.g., prepared from a single monomer species), copolymers (e.g., prepared from at least two monomer species), and graft polymers.

As used herein, the term "(meth)acrylate" and similar terms, such as "(meth)acrylic acid ester" means methacrylates and/or acrylates. As used herein, the term "(meth)acrylic acid" means methacrylic acid and/or acrylic acid.

The photochromic compounds of the present invention are, with some embodiments, also referred to herein as photochromic-dichroic compounds (such as, when they include one or more lengthening groups, such as $L_1$ and/or $L_2$).

The photochromic compounds of the present invention, as described herein, including, but not limited to, photochromic compounds represented by Formula (Ia), Formula (Ib), Formula (IIa), and Formula (IIb), in each case can optionally further include one or more coproducts, resulting from the synthesis of such compounds.

As used herein, the term "photochromic" and similar terms, such as "photochromic compound" means having an absorption spectrum for at least visible radiation that varies in response to absorption of at least actinic radiation. Further, as used herein the term "photochromic material" means any substance that is adapted to display photochromic properties (such as, adapted to have an absorption spectrum for at least visible radiation that varies in response to absorption of at least actinic radiation) and which includes at least one photochromic compound.

As used herein, the term "actinic radiation" means electromagnetic radiation that is capable of causing a response in a material, such as, but not limited to, transforming a photochromic material from one form or state to another as will be discussed in further detail herein.

As used herein, and unless stated otherwise or otherwise limited, the term "photochromic material" includes thermally reversible photochromic materials and compounds and non-thermally reversible photochromic materials and compounds. The term "thermally reversible photochromic compounds/materials" as used herein means compounds/materials capable of converting from a first state, for example a "clear state," to a second state, for example a "colored state," in response to actinic radiation, and reverting back to the first state in response to thermal energy. The term "non-thermally reversible photochromic compounds/materials" as used herein means compounds/materials capable of converting from a first state, for example a "clear state," to a second state, for example a "colored state," in response to actinic radiation, and reverting back to the first state in response to actinic radiation of substantially the same wavelength(s) as the absorption(s) of the colored state (e.g., discontinuing exposure to such actinic radiation).

As used herein to modify the term "state," the terms "first" and "second" are not intended to refer to any particular order or chronology, but instead refer to two different conditions or properties. For purposes of non-limiting illustration, the first state and the second state of a photochromic compound can differ with respect to at least one optical property, such as but not limited to the absorption of visible and/or UV radiation. Thus, according to various non-limiting embodiments disclosed herein, the photochromic compounds of the present invention can have a different absorption spectrum in each of the first and second state. For example, while not limiting herein, a photochromic compound of the present invention can be clear in the first state and colored in the second state. Alternatively, a photochromic compound of the present invention can have a first color in the first state and a second color in the second state.

As used herein the term "optical" means pertaining to or associated with light and/or vision. For example, according to various non-limiting embodiments disclosed herein, the optical article or element or device can be chosen from ophthalmic articles, elements and devices, display articles, elements and devices, windows, mirrors, and active and passive liquid crystal cell articles, elements and devices.

As used herein the term "ophthalmic" means pertaining to or associated with the eye and vision. Non-limiting examples of ophthalmic articles or elements include corrective and non-corrective lenses, including single vision or multi-vision lenses, which can be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors.

As used herein the term "display" means the visible or machine-readable representation of information in words, numbers, symbols, designs or drawings. Non-limiting examples of display elements include screens, monitors, and security elements, such as security marks.

As used herein the term "window" means an aperture adapted to permit the transmission of radiation therethrough. Non-limiting examples of windows include automotive and aircraft transparencies, windshields, filters, shutters, and optical switches.

As used herein the term "mirror" means a surface that specularly reflects a large fraction of incident light.

As used herein the term "liquid crystal cell" refers to a structure containing a liquid crystal material that is capable of being ordered. A non-limiting example of a liquid crystal cell element is a liquid crystal display.

As used herein, spatial or directional terms, such as "left", "right", "inner", "outer", "above", "below", and the like, relate to the invention as it is depicted in the drawing figures. It is to be understood, however, that the invention can assume various alternative orientations and, accordingly, such terms are not to be considered as limiting.

As used herein, the terms "formed over," "deposited over," "provided over," "applied over," "residing over," or "positioned over," mean formed, deposited, provided, applied, residing, or positioned on but not necessarily in direct (or abutting) contact with the underlying element, or surface of the underlying element. For example, a layer "positioned over" a substrate does not preclude the presence of one or more other layers, coatings, or films of the same or different composition located between the positioned or formed layer and the substrate.

As used herein, recitations relating to ring positions, such as but not limited to, position-x (e.g., position-3 or position-13) means a particular position in the ring structure, such as the fused ring structure, of a chemical compound, such as the silole or germole fused ring photochromic compounds of the present invention, and which are depicted herein in accordance with some embodiments by numbers within the ring structures of representative chemical formulas, such as but not limited to Formulas (Ia), (Ib), (IIa), and/or (IIb).

All documents, such as but not limited to issued patents and patent applications, referred to herein, and unless otherwise indicated, are to be considered to be "incorporated by reference" in their entirety.

As used herein, recitations of "linear or branched" groups, such as linear or branched alkyl, are herein understood to include: a methylene group or a methyl group; groups that are linear (or "straight"), such as linear $C_2$-$C_{20}$ alkyl groups; and groups that are appropriately branched, such as branched $C_3$-$C_{20}$ alkyl groups.

As used herein, recitations of "optionally substituted" group, means a group, including but not limited to, alkyl group, cycloalkyl group, heterocycloalkyl group, aryl group, and/or heteroaryl group, in which at least one hydrogen thereof has been optionally replaced or substituted with a group that is other than hydrogen, such as, but not limited to: halo groups (e.g., F, Cl, I, and Br); hydroxyl groups; ether groups; thiol groups; thio ether groups; carboxylic acid groups; carboxylic acid ester groups; phosphoric acid groups; phosphoric acid ester groups; sulfonic acid groups; sulfonic acid ester groups; nitro groups; cyano groups; alkyl groups; alkenyl groups; alkynyl groups; cycloalkyl groups (including poly-fused-ring cycloalkyl and polycyclocalkyl groups); heterocycloalkyl groups; aryl groups (including hydroxyl substituted aryl, such as phenol, and including poly-fused-ring aryl); heteroaryl groups (including poly-fused-ring heteroaryl groups); aralkyl groups; amine groups, such as —N($R_{11}$')($R_{12}$') where $R_{11}$' and $R_{12}$' are each independently selected, with some embodiments, from hydrogen, linear or branched $C_1$-$C_{20}$ alkyl, $C_3$-$C_{12}$ cycloakyl, $C_3$-$C_{12}$ heterocycloalkyl, aryl, and heteroaryl; and reactive substituents, including those classes and examples as described further herein.

As used herein, recitations of "halo substituted" and related terms (such as, but not limited to, haloalkyl groups, haloalkenyl groups, haloalkynyl groups, haloaryl groups and halo-heteroaryl groups) means a group in which at least one, and up to and including all of the available hydrogen groups thereof is substituted with a halo group. The term "halo-substituted" is inclusive of "perhalo-substituted." As used herein, the term perhalo-substituted group and related terms (such as, but not limited to perhaloalkyl groups, perhaloalkenyl groups, perhaloalkynyl groups, perhaloaryl groups and perhalo-heteroaryl groups) means a group in which all of the available hydrogen groups thereof are substituted with a halo group. For example, perhalomethyl is —$CX_3$; perhalophenyl is —$C_6X_5$, where X represents one or more halo groups, such as, but not limited to F.

The term "alkyl" as used herein, in accordance with some embodiments, means linear or branched alkyl, such as but not limited to, linear or branched $C_1$-$C_{25}$ alkyl, or linear or branched $C_1$-$C_{10}$ alkyl, or linear or branched $C_2$-$C_{10}$ alkyl. Examples of alkyl groups from which the various alkyl groups of the present invention can be selected from, include, but are not limited to, those recited further herein. Alkyl groups of the various compounds of the present invention can, with some embodiments, include one or more unsaturated linkages selected from —CH═CH— groups and/or one or more —C≡C— groups, provided the alkyl group is free of two or more conjugated unsaturated linkages. With some embodiments, the alkyl groups are free of unsaturated linkages, such as —CH═CH— groups and —C≡C— groups.

The term "cycloalkyl" as used herein, in accordance with some embodiments, means groups that are appropriately cyclic, such as but not limited to, $C_3$-$C_{12}$ cycloalkyl (including, but not limited to, cyclic $C_5$-$C_7$ alkyl) groups. Examples of cycloalkyl groups include, but are not limited to, those recited further herein. The term "cycloalkyl" as used herein in accordance with some embodiments also includes: bridged ring polycycloalkyl groups (or bridged ring polycyclic alkyl groups), such as but not limited to, bicyclo[2.2.1]heptyl (or norbornyl) and bicyclo[2.2.2]octyl; and fused ring polycycloalkyl groups (or fused ring polycyclic alkyl groups), such as, but not limited to, octahydro-1H-indenyl, and decahydronaphthalenyl.

The term "heterocycloalkyl" as used herein, in accordance with some embodiments, means groups that are appropriately cyclic, such as but not limited to, $C_3$-$C_{12}$ heterocycloalkyl groups or $C_5$-$C_7$ heterocycloalkyl groups, and which have at least one hetero atom in the cyclic ring, such as, but not limited to, O, S, N, P, and combinations thereof. Examples of heterocycloalkyl groups include, but are not limited to, imidazolyl, tetrahydrofuranyl, tetrahydropyranyl and piperidinyl. The term "heterocycloalkyl" as used herein, in accordance with some embodiments, also includes: bridged ring polycyclic heterocycloalkyl groups, such as but not limited to, 7-oxabicyclo[2.2.1]heptanyl; and fused ring polycyclic heterocycloalkyl groups, such as but not limited to, octahydrocyclopenta[b]pyranyl, and octahydro-1H-isochromenyl.

The term "heteroaryl," as used herein, in accordance with some embodiments, includes but is not limited to $C_5$-$C_{18}$ heteroaryl, such as but not limited to $C_5$-$C_{10}$ heteroaryl (including fused ring polycyclic heteroaryl groups) and means an aryl group having at least one hetero atom in the aromatic ring, or in at least one aromatic ring in the case of a fused ring polycyclic heteroaryl group. Examples of heteroaryl groups include, but are not limited to, furanyl, pyranyl, pyridinyl, isoquinoline, and pyrimidinyl.

As used herein, the term "fused ring polycyclic-aryl-alkyl group" and similar terms such as, fused ring polycyclic-alkyl-aryl group, fused ring polycyclo-aryl-alkyl group, and fused ring polycyclo-alkyl-aryl group means a fused ring polycyclic group that includes at least one aryl ring and at least one cycloalkyl ring that are fused together to form a fused ring structure. For purposes of non-limiting illustration, examples of fused ring polycyclic-aryl-alkyl groups include, but are not limited to indenyl, 9H-flourenyl, cyclopentanaphthenyl, and indacenyl.

The term "aralkyl," as used herein, and in accordance with some embodiments, includes but is not limited to $C_6$-$C_{24}$ aralkyl, such as but not limited to $C_6$-$C_{10}$ aralkyl, and means an aryl group substituted with an alkyl group. Examples of aralkyl groups include, but are not limited to, benzyl, and phenethyl.

Representative alkyl groups include but are not limited to methyl, ethyl, propyl, isopropyl, butyl, isobutyl, sec-butyl, tert-butyl, pentyl, neopentyl, hexyl, heptyl, octyl, nonyl and decyl. Representative alkenyl groups include but are not limited to vinyl, allyl and propenyl. Representative alkynyl groups include but are not limited to ethynyl, 1-propynyl, 2-propynyl, 1-butynyl, and 2-butynyl. Representative cycloalkyl groups include but are not limited to cyclopropyl, cyclobutyl, cyclopentyl, cyclohexyl, and cyclooctyl substituents. Representative heterocycloalkyl groups include but are not limited to imidazolyl, tetrahydrofuranyl, tetrahydropyranyl and piperidinyl. Representative aryl groups include but are not limited to phenyl, naphthyl, anthracynyl, phenanthrenyl, and tetrracenyl (including structural isomers thereof). Representative heteroaryl groups include but are not limited to furanyl, pyranyl, pyridinyl, isoquinolinyl, and pyrimidinyl. Representative aralkyl groups include but are not limited to benzyl, and phenethyl.

The silole and germole fused ring photochromic compounds according to the present invention, such as, but not limited to those represented by Formula (Ia), and the various groups thereof are described in further detail herein as follows.

With reference to Formula (Ia) and with some embodiments of the present invention, Ring A and Ring B each independently comprise aryl or heteroaryl. Examples of aryl groups from which Ring A and Ring B can each independently be selected include, but are not limited to, phenyl, naphthyl, antracynyl, phenanthrenyl, and tetrecenyl (including structural isomers thereof). Examples of heteroaryl groups from which Ring A and Ring B independently be selected include, but are not limited to, furanyl, pyranyl, pyridinyl, isoquinolinyl, and pyrimidinyl.

With some embodiments of the present invention, Ring A and Ring B of Formula (Ia) each independently comprise aryl. With some further embodiments of the present invention, of Formula (Ia) each independently comprise phenyl (or fused benzene), and the photochromic compounds of the present invention are represented by the following Formula (Ib):

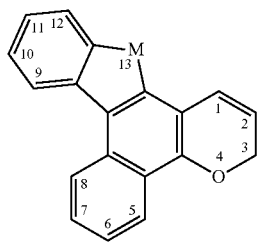

(Ib)

With reference to Formula (Ib), M comprises Si or Ge. The photochromic compound represented by Formula (Ib) is a thermally reversible photochromic compound.

The photochromic compounds of the present invention, with some embodiments, are represented by the following Formula (IIa):

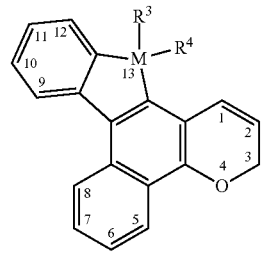

(IIa)

With reference to Formula (IIa), M comprises Si or Ge, and the photochromic compound represented by Formula (IIa) is a thermally reversible photochromic compound.

With further reference to Formula (IIa), $R^3$ and $R^4$ are each independently selected from the group consisting of, (i) hydrogen, halogen, cyano, nitro, substituted or unsubstituted linear or branched $C_1$-$C_{20}$ alkyl, substituted or unsubstituted $C_3$-$C_{10}$ cycloalkyl, substituted or unsubstituted $C_3$-$C_{10}$ heterocycloalkyl, allyl, substituted or unsubstituted aryl, or substituted or unsubstituted heteroaryl. With some embodiments, each alkyl substituent, each cycloalkyl substituent, each heterocycloalkyl substituent, each aryl substituent, and each heteroaryl substituent (from which $R^3$ and $R^4$ can each be independently selected), is in each case independently selected from the group consisting of hydroxyl, halogen, cyano, nitro, linear or branched $C_1$-$C_{20}$ alkyl, linear or branched $C_1$-$C_{20}$ haloalkyl, linear or branched $C_1$-$C_{20}$ perhaloalkyl, $C_3$-$C_{10}$ cycloalkyl, $C_3$-$C_{10}$ heterocycloalkyl, aryl, heteroaryl, —O—$R_{10}$', —S—$R_{10}$', —C(O)—$R_{10}$', —C(O)—$OR_{10}$', —OC(O)—$R_{10}$', —C(O)O—$R_{10}$', —Si($OR_{10'}$)$_w$($R_{10'}$)$_t$, polysiloxane, —N($R_{11}$')$R_{12}$', and combinations thereof, where w, t, each $R_{10}$', $R_{11}$', and $R_{12}$' are each independently as described as follows, with regard to the groups (ii) and (iii) from which $R^3$ and $R^4$ can each be independently selected.

With further reference to Formula (IIa), $R^3$ and $R^4$ are each independently selected from the group consisting of, (ii) —O—$R_{10}$', —S—$R_{10}$', —C(O)—$R_{10}$', —C(O)—$OR_{10}$', —OC(O)—$R_{10}$', —OC(O)O—$R_{10}$', —Si($OR_{10'}$)$_w$($R_{10'}$)$_t$, or polysiloxane, wherein each $R_{10'}$ independently is hydrogen, linear or branched $C_1$-$C_{20}$ alkyl, linear or branched $C_1$-$C_{20}$ haloalkyl, linear or branched $C_1$-$C_{20}$ perhaloalkyl, aryl, heteroaryl, phenyl($C_1$-$C_{20}$)alkyl, mono($C_1$-$C_{20}$)alkyl substituted phenyl($C_1$-$C_{20}$)alkyl, mono($C_1$-$C_{20}$)alkoxy substituted phenyl($C_1$-$C_{20}$)alkyl, ($C_1$-$C_{20}$)alkoxy($C_2$-$C_{20}$)alkyl, $C_3$-$C_{10}$ cycloalkyl, mono($C_1$-$C_{20}$)alkyl substituted $C_3$-$C_{10}$ cycloalkyl, $C_3$-$C_{10}$ heterocycloalkyl, or polysiloxane, and w and t are each independently 0 to 3, provided that w+t is 3.

With further reference to Formula (IIa), $R^3$ and $R^4$ are each independently selected from the group consisting of, (iii) —N($R_{11}$')$R_{12}$', wherein $R_{11}$' and $R_{12}$' are each independently hydrogen, linear or branched $C_1$-$C_{20}$ alkyl, phenyl, naphthyl, furanyl, benzofuran-2-yl, benzofuran-3-yl, thienyl, benzothien-2-yl, benzothien-3-yl, dibenzofuranyl, dibenzothienyl, benzopyridyl, fluorenyl, $C_1$-$C_{20}$ alkylaryl, $C_3$-$C_{10}$ cycloalkyl, $C_4$-$C_{20}$ bicycloalkyl, $C_5$-$C_{20}$ tricycloalkyl or linear or branched $C_1$-$C_{20}$ alkoxyalkyl, wherein the aryl group is phenyl or naphthyl, or $R_{11}$' and $R_{12}$' come together with the nitrogen atom to form a ring.

The various groups, and substituents of such groups, of the photochromic compounds of the present invention, such as, but not limited to, $R^3$ and $R^4$, and $R^1$ and $R^2$ (as described in further detail herein), can each be independently selected from —N($R_{11}$')$R_{12}$', where, with some embodiments, $R_{11}$' and $R_{12}'$ come together with the nitrogen atom to form a ring. The nitrogen containing ring represented by $-N(R_{11}')R_{12}'$, is, with some embodiments, more particularly represented by the following formula XIIA,

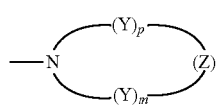

XIIA

With reference to Formula XIIA: each —Y— is independently chosen for each occurrence from $-CH_2-$, $-CH(R_{13}')-$, $-C(R_{13}')_2-$, $-CH(aryl)-$, $-C(aryl)_2-$, and $-C(R_{13}')(aryl)-$; and Z is —Y—, —O—, —S—, —S(O)—, $-SO_2-$, —NH—, $-N(R_{13}')-$, or —N(aryl)-, wherein each $R_{13}'$ is independently $C_1-C_{20}$ alkyl, each aryl is independently phenyl or naphthyl, m is an integer 1, 2 or 3, and p is an integer 0, 1, 2, or 3, and provided that when p is O, Z is —Y—.

The nitrogen containing ring represented by $-N(R_{11}')R_{12}'$, with some embodiments, includes nitrogen containing rings represented by the following formula XIIB or XIIC,

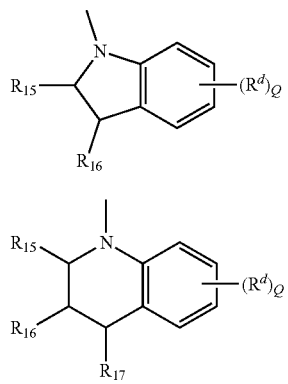

Independently for each of Formulas XIIB and XIIC, $R_{15}$, $R_{16}$, and $R_{17}$ are each independently hydrogen, $C_1-C_6$ alkyl, phenyl, or naphthyl, or the groups $R_{15}$ and $R_{16}$ together form a ring of 5 to 8 carbon atoms and each $R^d$ is independently for each occurrence selected from $C_1-C_{20}$ alkyl, $C_1-C_{20}$ alkoxy, fluoro or chloro, and Q is an integer 0, 1, 2, or 3.

With some embodiments, $R^3$ and $R^4$ of the photochromic compounds of the present invention, such as represented by Formula (IIa), are each independently selected from the group consisting of, (iv) a group $Y^2$, as described in further detail herein.

In accordance with some alterative embodiments of the present invention, and with further reference to Formula (IIa), (v) $R^3$ and $R^4$ together form a spiro substituent selected from the group consisting of a substituted or unsubstituted spiro-carbocyclic ring containing 3 to 10 carbon atoms, a substituted or unsubstituted spiro-heterocyclic ring containing 1 or 2 oxygen atoms and 3 to 10 carbon atoms including the spirocarbon atom, the spiro-carbocyclic ring and spiro-heterocyclic ring being annellated with 0, 1 or 2 benzene rings, each spiro-ring substituent independently being linear or branched $C_1-C_{20}$ alkyl.

With reference to Formula (IIa), and the various groups thereof, $Y^2$ comprises at least one residue of a ring-opened cyclic monomer, wherein each ring-opened cyclic monomer is independently selected from the group consisting of a ring-opened cyclic ester monomer and a ring-opened cyclic carbonate monomer.

In accordance with some additional embodiments, the photochromic compounds of the present invention are represented by the following Formula (IIb),

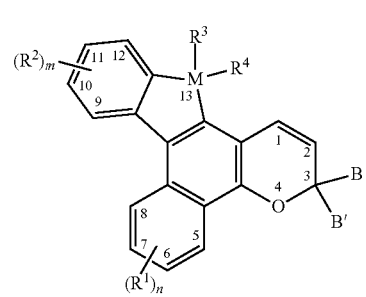

(IIb)

With reference to Formula (IIb): M is Si or Ge; subscript n is 1 to 4; subscript m is 1 to 4; and the photochromic compound is a thermally reversible photochromic compound.

With further reference to Formula (IIb), $R^1$ independently for each n, and $R^2$ independently for each m, are each independently selected from the group consisting of: (1) hydrogen; (2) cyano; (3) a reactive substituent (as described in further detail herein); (4) a lengthening group $L^1$ (as described in further detail herein); (5) halogen selected from the group consisting of fluoro, chloro, and bromo; (6) linear or branched $C_1-C_{20}$ alkyl; (7) linear or branched $C_1-C_{20}$ haloalkyl; (8) linear or branched $C_1-C_{20}$ perhaloalkyl; (9) substituted or unsubstituted $C_3-C_{10}$ cycloalkyl; (10) $-B(OR_{30})(OR_{31})$, in which $R_{30}$ and $R_{31}$ are each independently selected from the group consisting of hydrogen and linear or branched $C_1-C_{20}$ alkyl, or $R_{30}$ and $R_{31}$ together form a 5- or 6-membered ring including the boron atom; (11) a group $Y^1$ (as described in further detail herein); (12) substituted or unsubstituted aryl; (13) substituted or unsubstituted heterocycloalkyl; and (14) substituted or unsubstituted heteroaryl.

Each cycloalkyl substituent, each heterocycloalkyl substituent, each aryl substituent, and each heteroaryl substituent, from which $R^1$ independently for each n and $R^2$ independently for each m, can each be independently selected, is in each case independently selected, with some embodiments, from the group consisting of, hydroxyl, halogen, cyano, linear or branched $C_1-C_{20}$ alkyl, linear or branched $C_1-C_{20}$ haloalkyl, linear or branched $C_1-C_{20}$ perhaloalkyl, $C_3-C_{10}$ cycloalkyl, $C_3-C_{10}$ heterocycloalkyl, aryl, heteroaryl, the reactive substituent, $-O-R_{10}'$, $-S-R_{10}'$, $-C(O)-R_{10}'$, $-C(O)-OR_{10}'$, $-OC(O)-R_{10}'$, $-OC(O)O-R_{10}'$, $-C(O)N(R_{10}')R_{10}'$, $-(R_{10}')C(O)N(R_{10}')(R_{10}')$, $-Si(OR_{10}')_w(R_{10}')_t$, polysiloxane, $-N(R_{11}')R_{12}'$, and combinations thereof, where w, t, each $R_{10}'$, $R_{11}'$, and $R_{12}'$ are each independently as described as follows with regard to the groups (15) and (17) from which $R^1$ independently for each n and $R^2$ independently for each m, can each be independently selected.

With further reference to Formula (IIb) and in accordance with some embodiments, $R^1$ independently for each n and $R^2$ independently for each m, are each further independently selected from (15) $-O-R_{10}'$, $-S-R_{10}'$, $-C(O)-R_{10}'$, $-C(O)-OR_{10}'$, —OC(O)—$R_{10'}$, —OC(O)O—$R_{10'}$, —C(O)N($R_{10'}$)$R_{10'}$, —N($R_{10'}$)C(O)N($R_{10'}$)($R_{10'}$), —Si(O$R_{10'}$)$_w$($R_{10'}$)$_t$, or polysiloxane, wherein each $R_{10}'$, independently is hydrogen, linear or branched $C_1$-$C_{20}$ alkyl, linear or branched $C_1$-$C_{20}$ haloalkyl, linear or branched $C_1$-$C_{20}$ perhaloalkyl, aryl, heteroaryl, phenyl($C_1$-$C_{20}$)alkyl, mono($C_1$-$C_{20}$)alkyl substituted phenyl ($C_1$-$C_{20}$)alkyl, mono ($C_1$-$C_{20}$)alkoxy substituted phenyl($C_1$-$C_{20}$)alkyl, ($C_1$-$C_{20}$)alkoxy($C_2$-$C_{20}$)alkyl, $C_3$-$C_{10}$ cycloalkyl, mono($C_1$-$C_{20}$)alkyl substituted $C_3$-$C_{10}$ cycloalkyl, $C_3$-$C_{10}$ heterocycloalkyl, or polysiloxane, and w and t are each independently 0 to 3, provided that w+t is 3.

With additional reference to Formula (IIb) and in accordance with some embodiments, $R^1$ independently for each n and $R^2$ independently for each m, are each further independently selected from, (16) a polyether represented by the following Formula (a),

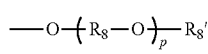
(a)

With reference to Formula (a): subscript p is 1 to 100, or 1 to 50, or 1 to 25, or 1 to 15, or 1 to 10, or 1 to 5; $R_8$ independently for each p is linear or branched $C_1$-$C_{20}$ alkylene, or linear or branched $C_1$-$C_{10}$ alkylene, or linear or branched $C_1$-$C_6$ alkylene, such as 1,2-ethylene or 1,2-propylene; and $R_8'$ is selected from the group consisting of hydrogen, linear or branched $C_1$-$C_{20}$ alkyl (or linear or branched $C_1$-$C_{10}$ alkyl, or linear or branched $C_1$-$C_6$ alkyl), and a reactive substituent.

With further additional reference to Formula (IIb) and in accordance with some embodiments, $R^1$ independently for each n and $R^2$ independently for each m, are each further independently selected from, (17) —N($R_{11}'$)$R_{12}'$, wherein $R_{11}'$ and $R_{12}'$ are each independently hydrogen, linear or branched $C_1$-$C_{20}$ alkyl, phenyl, naphthyl, furanyl, benzofuran-2-yl, benzofuran-3-yl, thienyl, benzothien-2-yl, benzothien-3-yl, dibenzofuranyl, dibenzothienyl, benzopyridyl, fluorenyl, $C_1$-$C_{20}$ alkylaryl, $C_3$-$C_{10}$ cycloalkyl, $C_4$-$C_{20}$ bicycloalkyl, $C_5$-$C_{20}$ tricycloalkyl or linear or branched $C_1$-$C_{20}$ alkoxyalkyl, wherein the aryl group is phenyl or naphthyl, or $R_{11}'$ and $R_{12}'$ come together with the nitrogen atom to form a ring.

With reference to Formula (IIb), $R^3$ and $R^4$ are each independently selected from the group consisting of, (i) hydrogen, halogen, cyano, nitro, substituted or unsubstituted linear or branched $C_1$-$C_{10}$ alkyl, substituted or unsubstituted $C_3$-$C_7$ cycloalkyl, substituted or unsubstituted $C_3$-$C_7$ heterocycloalkyl, allyl, substituted or unsubstituted phenyl, or substituted or unsubstituted heteroaryl. Each alkyl substituent, each cycloalkyl substituent, each heterocycloalkyl substituent, each phenyl substituent, and each heteroaryl substituent, from which $R^3$ and $R^4$ of Formula (IIb) can each be independently selected, is in each case independently selected from the group consisting of hydroxyl, halogen, cyano, nitro, linear or branched $C_1$-$C_{10}$ alkyl, linear or branched $C_1$-$C_{10}$ haloalkyl, linear or branched $C_1$-$C_{10}$ perhaloalkyl, $C_3$-$C_7$ cycloalkyl, $C_3$-$C_7$ —O—$R_{10}'$, —S—$R_{10}'$, —C(O)—$R_{10}'$, —C(O)—O$R_{10}'$, and combinations thereof, where each $R_{10}'$ of —O—$R_{10}'$, —S—$R_{10}'$, —C(O)—$R_{10}'$, and —C(O)—O$R_{10}'$, is independently as described as follows with regard to the group (ii) from which $R^3$ and $R^4$ can each be independently selected.

With further reference to Formula (IIb), $R^3$ and $R^4$ are each independently further selected from the group consisting of, (ii) —O—$R_{10}'$, —S—$R_{10}'$, —C(O)—$R_{10}'$, —C(O)— $R_{10}'$, —OC(O)—$R_{10}'$, —OC(O)O—$R_{10}'$, or —Si(O$R_{10}'$)$_w$ ($R_{10}'$)$_t$, wherein each $R_{10}'$, independently is hydrogen, linear or branched $C_1$-$C_{10}$ alkyl, linear or branched $C_1$-$C_{10}$ haloalkyl, linear or branched $C_1$-$C_{10}$ perhaloalkyl, aryl, heteroaryl, phenyl($C_1$-$C_{10}$)alkyl, mono($C_1$-$C_{10}$)alkyl substituted phenyl ($C_1$-$C_{10}$)alkyl, mono($C_1$-$C_{10}$)alkoxy substituted phenyl($C_1$-$C_{10}$)alkyl, ($C_1$-$C_{10}$)alkoxy($C_2$-$C_{10}$)alkyl, $C_3$-$C_7$ cycloalkyl, mono($C_1$-$C_{10}$)alkyl substituted $C_3$-$C_7$ cycloalkyl, or $C_3$-$C_7$ heterocycloalkyl, and w and t are each independently 0 to 3, provided that w+t is 3.

With additional reference to Formula (IIb), $R^3$ and $R^4$ are each independently further selected from the group consisting of: (iii) —N($R_{11}'$)$R_{12}'$, wherein $R_{11}'$ and $R_{12}'$ are each independently hydrogen, linear or branched $C_1$-$C_{10}$ alkyl, $C_3$-$C_7$ cycloalkyl, and phenyl, or $R_{11}'$ and $R_{12}'$ come together with the nitrogen atom to form a ring; and (iv) the group $Y^2$ (as described in further detail herein).

With additional further reference to Formula (IIb), and in accordance with some alternative embodiments of the present invention, (v) $R^3$ and $R^4$ together form a spiro substituent that is a substituted or unsubstituted spiro-carbocyclic ring containing 3 to 10 carbon atoms.

With reference to Formula (IIb), B and B' are each independently selected from the group consisting of unsubstituted aryl, substituted aryl, unsubstituted heteroaryl, substituted heteroaryl, alkenyl, and alkynyl, or B and B' taken together form a ring structure. The aryl substituents and the heteroaryl substituents of B and B', with some embodiments, each independently and optionally comprise (but are not limited to) a lengthening group $L^2$ (as described in further detail herein).

Each lengthening group $L^1$ and $L^2$, of the photochromic compounds of the present invention, such as represented by Formula (IIb), is independently represented by the following Formula (III),

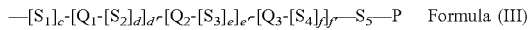 Formula (III)

With reference to Formula (III), and in accordance with some embodiments of the present invention, (a) $Q_1$, $Q_2$, and $Q_3$ for each occurrence, are independently a divalent group selected from the group consisting of unsubstituted aryl, substituted aryl, unsubstituted heteroaryl, substituted heteroaryl, unsubstituted cycloalkyl, substituted cycloalkyl, unsubstituted heterocycloalky, and substituted heterocycloalkyl.

The aryl substituents, heteroaryl substituents, cycloalkyl substituents, and heterocycloalkyl substituents (from which $Q_1$, $Q_2$, and $Q_3$ are each independently selected) are each independently selected from the group consisting of P (as described in further detail herein), liquid crystal mesogens, halogen, poly($C_1$-$C_{18}$ alkoxy), $C_1$-$C_{18}$ alkoxycarbonyl, $C_1$-$C_{18}$ alkylcarbonyl, $C_1$-$C_{18}$ alkoxycarbonyloxy, aryloxycarbonyloxy, perfluoro($C_1$-$C_{18}$)alkoxy, perfluoro($C_1$-$C_{18}$) alkoxycarbonyl, perfluoro($C_1$-$C_{18}$)alkylcarbonyl, perfluoro ($C_1$-$C_{18}$)alkylamino, di-(perfluoro($C_1$-$C_{18}$)alkyl)amino, perfluoro($C_1$-$C_{18}$)alkylthio, $C_1$-$C_{18}$ alkylthio, $C_1$-$C_{18}$ acetyl, $C_3$-$C_{10}$ cycloalkyl, $C_3$-$C_{10}$ cycloalkoxy, straight-chain $C_1$-$C_{18}$ alkyl, and branched $C_1$-$C_{18}$ alkyl. The straight-chain $C_1$-$C_{18}$ alkyl and branched $C_1$-$C_{18}$ alkyl (of the aryl substituents, heteroaryl substituents, cycloalkyl substituents, and heterocycloalkyl substituents, of $Q_1$, $Q_2$, and $Q_3$,) are each independently mono-substituted with a group selected from the group consisting of cyano, halogen, and $C_1$-$C_{18}$ alkoxy. Alternatively, the straight-chain $C_1$-$C_{18}$ alkyl and branched $C_1$-$C_{18}$ alkyl (of the aryl substituents, heteroaryl substituents, cycloalkyl substituents, and heterocycloalkyl substituents, of $Q_1$, $Q_2$, and $Q_3$,) are each independently poly-substituted with at least two groups independently selected from the group consisting of halogen, -M'(T)$_{(v-1)}$ and -M'(OT)$_{(v-1)}$, wherein M' is chosen from aluminum, antimony, tantalum, titanium, zirconium and silicon, T is chosen from organofunctional radicals, organofunctional hydrocarbon radicals, aliphatic hydrocarbon radicals and aromatic hydrocarbon radicals, and v is the valence of M'.

With further reference to Formula (III), (b) subscripts c, d, e, and f are each independently chosen from an integer of 1 to 20; and each $S_1$, $S_2$, $S_3$, $S_4$, and $S_5$ is independently chosen for each occurrence from a spacer unit selected from the group consisting of: (i) alkylene, substituted alkylene, haloalkylene, substituted haloalkylene, —Si(CH$_2$)$_g$—, and —Si[(CH$_3$)$_2$]O)$_h$—, wherein g for each occurrence is independently chosen from an integer from 1 to 20; h for each occurrence is independently chosen from an integer from 1 to 16; and the substitutes for the alkylene and haloalkylene are independently selected from the group consisting of $C_1$-$C_{18}$ alkyl, $C_3$-$C_{10}$ cycloalkyl and aryl; (ii) —N(Z)—, —C(Z)=C(Z)—, —C(Z)=N—, —C(Z')$_2$—C(Z')$_2$—, —N(Z)—C(Z)$_2$—, and a single bond, wherein Z for each occurrence is independently selected from the group consisting of hydrogen, $C_1$-$C_{18}$ alkyl, $C_3$-$C_{10}$ cycloalkyl and aryl, and Z' for each occurrence is independently selected from the group consisting of $C_1$-$C_{18}$ alkyl, $C_3$-$C_{10}$ cycloalkyl and aryl; and (iii) —O—, —C(=O)—, —C≡C—, —N=N—, —S—, —S(=O)—, —(O=)S(=O)—, —(O=)S(=O)O—, —O(O=)S(=O)O— and straight-chain or branched $C_1$-$C_{24}$ alkylene residue, the $C_1$-$C_{24}$ alkylene residue being unsubstituted, mono-substituted by cyano or halogen, or poly-substituted by halogen. With regard to $S_1$, $S_2$, $S_3$, $S_4$, and $S_5$ there is the proviso that when two spacer units comprising heteroatoms are linked together the spacer units are linked so that heteroatoms are not directly linked to each other, and the bond between $S_5$ and P is free of two heteroatoms linked to each other.

With additional reference to Formula (III), (c) P for each occurrence is independently selected from the group consisting of hydroxy, amino, $C_2$-$C_{18}$ alkenyl, $C_2$-$C_{18}$ alkynyl, azido, silyl, siloxy, silylhydride, (tetrahydro-2H-pyran-2-yl) oxy, thio, isocyanato, thioisocyanato, acryloyloxy, methacryloyloxy, 2-(acryloyloxy)ethylcarbamyl, 2-(methacryloyloxy)ethylcarbamyl, aziridinyl, allyloxycarbonyloxy, epoxy, carboxylic acid, carboxylic ester, acryloylamino, methacryloylamino, aminocarbonyl, $C_1$-$C_{18}$ alkyl aminocarbonyl, aminocarbonyl($C_1$-$C_{18}$)alkyl, $C_1$-$C_{18}$ alkyloxycarbonyloxy, halocarbonyl, hydrogen, aryl, hydroxy($C_1$-$C_{18}$)alkyl, $C_1$-$C_{18}$ alkyl, $C_1$-$C_{18}$ alkoxy, amino($C_1$-$C_{18}$)alkyl, $C_1$-$C_{18}$ alkylamino, di-($C_1$-$C_{18}$)alkylamino, $C_1$-$C_{18}$ alkyl($C_1$-$C_{18}$)alkoxy, $C_1$-$C_{18}$ alkoxy($C_1$-$C_{18}$)alkoxy, nitro, poly($C_1$-$C_{18}$)alkyl ether, ($C_1$-$C_{18}$)alkyl($C_1$-$C_{18}$)alkoxy($C_1$-$C_{18}$) alkyl, polyethyleneoxy, polypropyleneoxy, ethylene, acryloyl, acryloyloxy($C_1$-$C_{18}$)alkyl, methacryloyl, methacryloyloxy($C_1$-$C_{18}$)alkyl, 2-chloroacryloyl, 2-phenylacryloyl, acryloyloxyphenyl, 2-chloroacryloylamino, 2-phenylacryloylaminocarbonyl, oxetanyl, glycidyl, cyano, isocyanato($C_1$-$C_{18}$)alkyl, itaconic acid ester, vinyl ether, vinyl ester, a styrene derivative, main-chain and side-chain liquid crystal polymers, siloxane derivatives, ethyleneimine derivatives, maleic acid derivatives, maleimide derivatives, fumaric acid derivatives, unsubstituted cinnamic acid derivatives, cinnamic acid derivatives that are substituted with at least one of methyl, methoxy, cyano and halogen, and substituted or unsubstituted chiral or non-chiral monovalent or divalent groups chosen from steroid radicals, terpenoid radicals, alkaloid radicals and mixtures thereof, wherein the substituents are independently chosen from $C_1$-$C_{18}$ alkyl, $C_1$-$C_{18}$ alkoxy, amino, $C_3$-$C_{10}$ cycloalkyl, $C_1$-$C_{18}$ alkyl($C_1$-$C_{18}$)alkoxy, fluoro($C_1$-$C_{18}$)alkyl, cyano, cyano($C_1$-$C_{18}$)alkyl, cyano($C_1$-$C_{18}$)alkoxy or mixtures thereof, or P is a structure having from 2 to 4 reactive groups, or P is an unsubstituted or substituted ring opening metathesis polymerization precursor, or P is a substituted or unsubstituted photochromic compound.

With further additional reference to Formula (III), subscripts d', e' and f' are each independently chosen from 0, 1, 2, 3, and 4, provided that the sum of d'+e'+f' is at least 1.

With reference to Formula (IIb), and the various groups thereof, $Y^1$ and $Y^2$ independently comprises at least one residue of a ring-opened cyclic monomer, wherein each ring-opened cyclic monomer is independently selected from the group consisting of a ring-opened cyclic ester monomer and a ring-opened cyclic carbonate monomer.

With reference to Formula (IIb), and in accordance with some embodiments, $R^1$ independently for each n, and $R^2$ independently for each m, are each independently selected from the group consisting of: (1) hydrogen; (2) cyano; (3) the lengthening group $L^1$; (4) halogen selected from the group consisting of fluoro, chloro, and bromo; (5) linear or branched $C_1$-$C_{10}$ alkyl; (6) linear or branched $C_1$-$C_{10}$ perhaloalkyl; (7) substituted or unsubstituted $C_3$-$C_7$ cycloalkyl; (8) —O—$R_{10}$'; (9) —S—$R_{10}$'; (10) the group $Y^1$ (as described in further detail herein); (11) substituted or unsubstituted phenyl; (12) substituted or unsubstituted heterocycloalkyl; and (13) substituted or unsubstituted heteroaryl.

Each cycloalkyl substituent, each phenyl substituent, each heterocycloalkyl substituent, and each heteroaryl substituent, from which $R^1$ independently for each n and $R^2$ independently for each m, can each be independently selected, is in each case independently selected, with some embodiments, from the group consisting of at least one of hydroxyl, halogen, cyano, linear or branched $C_1$-$C_{10}$ alkyl, linear or branched $C_1$-$C_{10}$ haloalkyl, linear or branched $C_1$-$C_{10}$ perhaloalkyl, $C_3$-$C_7$ cycloalkyl, $C_3$-$C_7$ heterocycloalkyl.

With reference to Formula (IIb), and in accordance with some embodiments, $R^1$ independently for each n, and $R^2$ independently for each m, are each independently further selected from, (14) —O—$R_{10}$', —S—$R_{10}$', —C(O)—$R_{10}$', —C(O)—O$R_{10}$', and combinations thereof, where each $R_{10}$' is independently as described as follows, wherein each $R_{10}$', of —O—$R_{10}$', —S—$R_{10}$', —C(O)—$R_{10}$', and —C(O)—O$R_{10}$', independently is hydrogen, linear or branched $C_1$-$C_{10}$ alkyl, linear or branched $C_1$-$C_{10}$ haloalkyl, linear or branched $C_1$-$C_{10}$ perhaloalkyl, phenyl, phenyl($C_1$-$C_{10}$)alkyl, mono($C_1$-$C_{10}$)alkyl substituted phenyl($C_1$-$C_{10}$)alkyl, mono ($C_1$-$C_{10}$)alkoxy substituted phenyl($C_1$-$C_{10}$)alkyl, ($C_1$-$C_{10}$) alkoxy($C_2$-$C_{10}$)alkyl, $C_3$-$C_7$ cycloalkyl, mono($C_1$-$C_{10}$)alkyl substituted $C_3$-$C_7$ cycloalkyl, or $C_3$-$C_7$ heterocycloalkyl.

With reference to Formula (IIb), and in accordance with some embodiments, $R^3$ and $R^4$ are each independently selected from the group consisting of, hydrogen; linear or branched $C_1$-$C_8$ alkyl; linear or branched $C_1$-$C_8$ haloalkyl; $C_3$-$C_6$ cycloalkyl; and the group $Y^2$ (as described in further detail herein); or $R^3$ and $R^4$ together form a spiro substituent that is a substituted or unsubstituted spiro-carbocyclic ring containing 3 to 10 carbon atoms.

With reference to Formula (IIb), and with some embodiments of the present invention, B and B' are in each case independently selected from the group consisting of: an aryl group that is mono-substituted with a reactive substituent; a substituted phenyl; a substituted aryl; a substituted 9-julolidinyl; a substituted heteroaromatic group chosen from pyridyl, furanyl, benzofuran-2-yl, benzofuran-3-yl, thienyl, benzothien-2-yl, benzothien-3-yl, dibenzofuranyl, dibenzothienyl, carbazoyl, benzopyridyl, indolinyl, and fluorenyl, wherein the phenyl, aryl, 9-julolidinyl, or heteroaromatic substituent is a reactive substituent R; an unsubstituted, mono-, di-, or tri-substituted phenyl or aryl group; 9-julolidinyl; or an unsubstituted, mono- or di-substituted heteroaromatic group chosen from pyridyl, furanyl, benzofuran-2-yl, benzofuran-3-yl, thienyl, benzothien-2-yl, benzothien-3-yl, dibenzofuranyl, dibenzothienyl, carbazoyl, benzopyridyl, indolinyl, and fluorenyl.

Each of the phenyl, aryl and heteroaromatic substituents (of B and B') are each independently, with some embodiments: (a) the lengthening group $L^2$; or (b) hydroxyl, a group —C(=O)$R_{21}$, wherein $R_{21}$ is —O$R_{22}$, —N($R_{23}$)$R_{24}$, piperdino, or morpholino, wherein $R_{22}$ is allyl, linear or branched $C_1$-$C_{20}$ alkyl, phenyl, mono($C_1$-$C_{20}$)alkyl substituted phenyl, mono($C_1$-$C_{20}$)alkoxy substituted phenyl, phenyl($C_1$-$C_{20}$)alkyl, mono($C_1$-$C_{20}$)alkyl substituted phenyl($C_1$-$C_{20}$)alkyl, mono($C_1$-$C_{20}$)alkoxy substituted phenyl($C_1$-$C_{20}$)alkyl, $C_1$-$C_{20}$ alkoxy($C_2$-$C_{20}$)alkyl or $C_1$-$C_{20}$ haloalkyl, $R_{23}$ and $R_{24}$ are each independently $C_1$-$C_{20}$ alkyl, $C_5$-$C_{10}$ cycloalkyl, phenyl or substituted phenyl, the phenyl substituents being $C_1$-$C_{20}$ alkyl or $C_1$-$C_{20}$ alkoxy, and the halo substituent is chloro or fluoro, aryl, mono($C_1$-$C_{20}$)alkoxyaryl, di($C_1$-$C_{20}$)alkoxyaryl, mono($C_1$-$C_{20}$)alkylaryl, di($C_1$-$C_{20}$)alkylaryl, haloaryl, $C_3$-$C_{10}$ cyclo alkylaryl, $C_3$-$C_{10}$ cycloalkyl, $C_3$-$C_{10}$ cycloalkyloxy, $C_3$-$C_{10}$ cycloalkyloxy($C_1$-$C_{20}$)alkyl, $C_3$-$C_{10}$ cycloalkyloxy($C_1$-$C_{20}$)alkoxy, aryl($C_1$-$C_{20}$)alkyl, aryl($C_1$-$C_{20}$)alkoxy, aryloxy, aryloxy($C_1$-$C_{20}$)alkyl, aryloxy($C_1$-$C_{20}$)alkoxy, mono- or di($C_1$-$C_{20}$)alkylaryl($C_1$-$C_{20}$)alkyl, mono- or di-($C_1$-$C_{20}$)alkoxyaryl($C_1$-$C_{20}$)alkyl, mono- or di-($C_1$-$C_{20}$)alkylaryl($C_1$-$C_{20}$)alkoxy, mono- or di-($C_1$-$C_{20}$)alkoxyaryl($C_1$-$C_{20}$)alkoxy, amino, mono- or di-($C_1$-$C_{20}$)alkylamino, diarylamino, piperazino, N—($C_1$-$C_{20}$)alkylpiperazino, N-arylpiperazino, aziridino, indolino, piperidino, morpholino, thiomorpholino, tetrahydroquinolino, tetrahydroisoquinolino, pyrrolidyl, $C_1$-$C_{20}$ alkyl, $C_1$-$C_{20}$ haloalkyl, $C_1$-$C_{20}$ alkoxy, mono($C_1$-$C_{20}$)alkoxy($C_1$-$C_{20}$)alkyl, acryloxy, methacryloxy, or halogen.

Each of the phenyl, aryl and heteroaromatic substituents (of B and B') are each independently, with some further embodiments: (c) an unsubstituted or mono-substituted group chosen from pyrazolyl, imidazolyl, pyrazolinyl, imidazolinyl, pyrrolinyl, phenothiazinyl, phenoxazinyl, phenazinyl, and acridinyl, each of the substituents being $C_1$-$C_{20}$ alkyl, $C_1$-$C_{20}$ alkoxy, phenyl, or halogen.

Each of the phenyl, aryl and heteroaromatic substituents (of B and B') are each independently, with some further embodiments: (d) a group represented by one of the following Formulas (D) and (E):

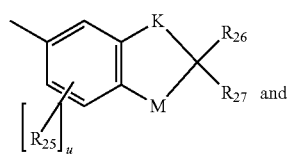

(D)

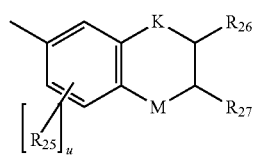

(E)

With reference to Formulas (D) and (E), each K is —CH$_2$— or —O—, and M is —O— or substituted nitrogen, provided that when M is substituted nitrogen, K is —CH$_2$—, the substituted nitrogen substituents being hydrogen, $C_1$-$C_{20}$ alkyl, or $C_1$-$C_{20}$ acyl, each $R_{25}$ being independently chosen for each occurrence from $C_1$-$C_{20}$ alkyl, $C_1$-$C_{20}$ alkoxy, hydroxy, and halogen, $R_{26}$ and $R_{27}$ each being independently hydrogen or $C_1$-$C_{20}$ alkyl, and u is an integer ranging from 0 to 2.

Each of the phenyl, aryl and heteroaromatic substituents (of B and B') are each independently, with some further additional embodiments: (e) a group represented by the following Formula (F):

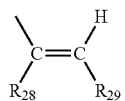

(F)

With reference to Formula (F), $R_{28}$ is hydrogen or $C_1$-$C_{20}$ alkyl, and $R_{29}$ is an unsubstituted, mono-, or di-substituted group chosen from naphthyl, phenyl, furanyl, and thienyl, wherein the substituents are $C_1$-$C_{20}$ alkyl, $C_1$-$C_{20}$ alkoxy, or halogen.

With some alternative embodiments, (f) B and B', of Formula (IIb), taken together form one of a fluoren-9-ylidene, mono-, or di-substituted fluoren-9-ylidene, each of the fluoren-9-ylidene substituents being independently chosen from $C_1$-$C_{20}$ alkyl, $C_1$-$C_{20}$ alkoxy, and halogen.

With the photochromic compounds of the present invention, such as represented by Formula (IIb), and in accordance with some embodiments, independently for each group $Y^1$ and $Y^2$, each cyclic ester monomer, of each ring-opened cyclic ester monomer, is independently represented by the following Formula (A):

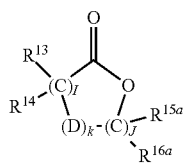

(A)

With reference to Formula (A), I and J are each independently integers ranging from 1 to 8; $R^{13}$, $R^{14}$, $R^{15a}$, and $R^{16a}$ are independently chosen for each carbon unit (C)$_I$ and (C)$_J$ from —H and $C_1$-$C_{16}$ alkyl; k is 0 or 1; and D is —O— when k is 1.

With the photochromic compounds of the present invention, such as represented by Formula (IIb), and in accordance with some embodiments, independently for each group $Y^1$ and $Y^2$, each cyclic ester monomer, of each of each ring-opened cyclic ester monomer, is independently selected from the group consisting of, ε(epsilon)-caprolactone; t-butyl caprolactone; ζ(zeta)-enantholactone; δ(delta)-valerolactone; a monoalkyl δ(delta)-valerolactone; a monoalkyl-, dialkyl-, or trialkyl-ε(epsilon)-caprolactone; β(beta)-lactones; γ(gamma)-lactones; dilactones; and 1,4-dioxan-2-one. Examples of monoalkyl-, dialkyl-, or trialkyl-ε (epsilon)-caprolactones include, but are not limited to: monomethyl-, monoethyl-, monohexyl-, dimethyl-, di-n-propyl-, mono-/di-/tri-t(tertiary)-butyl-, di-n-hexyl-, trimethyl-, and triethyl-, ε(epsilon)-caprolactones; 5-nonyl-oxepan-2-one; 4,4,6- or 4,6,6-trimethyl-oxepan-2-one; and 5-hydroxymethyl-oxepan-2-one. Examples of β(beta)-lactones include, but are not limited to: β(beta)-propiolactone; and β(beta)-butyrolactone. Examples of γ(gamma)-lactones include, but are not limited to: γ(gamma)-butyrolactone; and pivalolactone.

With the photochromic compounds of the present invention, such as represented by Formula (IIb), and in accordance with some embodiments, independently for each group $Y^1$ and $Y^2$, each cyclic carbonate monomer, of each ring-opened cyclic carbonate monomer, is independently represented by the following Formula (B):

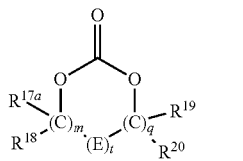

(B)

With reference to Formula (B), subscripts m and q are each independently integers ranging from 1 to 3; $R^{17a}$, $R^{18}$, $R^{19}$ and $R^{20}$ are each independently chosen for each carbon unit $(C)_m$ and $(C)_q$ from —H and $C_1$-$C_{16}$ alkyl; t is 0 or 1; and E is —O— when t is 1.

With the photochromic compounds of the present invention, such as represented by Formula (IIb), and in accordance with some embodiments, independently for each group $Y^1$ and $Y^2$, each cyclic carbonate monomer, of each ring-opened cyclic carbonate monomer, is independently selected from the group consisting of, ethylene carbonate; 3-ethyl-3-hydroxylmethyl trimethylene carbonate; propylene carbonate, trimethylene carbonate; trimethylolpropane monocarbonate; 4,6-dimethyl-1,3-propylene carbonate; 2,2-dimethyl trimethylene carbonate; and 1,3-dioxepan-2-one.

Each group $Y^1$ and $Y^2$, with some embodiments, independently and optionally include at least one reactive substituent, which can be selected from those classes and examples of reactive substituents as described further herein, such as, but not limited to: active hydrogen groups (such as hydroxyl groups); and ethylenically unsaturated and radically polymerizable groups (such as vinyl groups and (meth)acryloyl groups). Each reactive substituent can independently be a pendent reactive substituent or a terminal reactive substituent.

With reference to Formula (IIb), and in accordance with some embodiments of the photochromic compounds of the present invention, $R^1$ independently for each n, and $R^2$ independently for each m, are each independently selected from the group consisting of: (1) hydrogen; (2) cyano; (3) the lengthening group $L^1$; (4) linear or branched $C_1$-$C_6$ alkyl; (5) substituted or unsubstituted $C_3$-$C_6$ cycloalkyl; (6) linear or branched $C_1$-$C_8$ perhaloalkyl; (7) fluoro; (8) chloro; (9) bromo, (9) —O—$R_{10}$', (10) —S—$R_{10}$'; (11) the group $Y^1$; (12) substituted or unsubstituted phenyl; (13) substituted or unsubstituted heterocycloalkyl; and (14) substituted or unsubstituted heteroaryl.

Each cycloalkyl substituent, each phenyl substituent, each heterocycloalkyl substituent, and each heteroaryl substituent, from which $R^1$ independently for each n and $R^2$ independently for each m, can each be independently selected, is in each case independently selected, with some embodiments, from the group consisting of at least one of hydroxyl, halogen, cyano, linear or branched $C_1$-$C_6$ alkyl, linear or branched $C_1$-$C_6$ haloalkyl, linear or branched $C_1$-$C_6$ perhaloalkyl, —O—$R_{10}$', —S—$R_{10}$', —C(O)—$R_{10}$', —C(O)—$OR_{10}$', and combinations thereof, where each $R_{10}$' is independently as described as follows.

Independently for each $R^1$ and each $R^2$, and the substituents thereof, each $R_{10}$% of —O—$R_{10}$', —S—$R_{10}$', —C(O)—$R_{10}$', and —C(O)—$OR_{10}$', independently is, with some embodiments, hydrogen, linear or branched $C_1$-$C_6$ alkyl, linear or branched $C_1$-$C_6$ haloalkyl, linear or branched $C_1$-$C_6$ perhaloalkyl, phenyl, phenyl($C_1$-$C_6$)alkyl, mono($C_1$-$C_6$)alkyl substituted phenyl($C_1$-$C_6$)alkyl, mono($C_1$-$C_6$) alkoxy substituted phenyl($C_1$-$C_6$)alkyl, ($C_1$-$C_6$)alkoxy($C_2$-$C_6$)alkyl, $C_3$-$C_6$ cycloalkyl, mono($C_1$-$C_6$)alkyl substituted $C_3$-$C_6$ cycloalkyl, or $C_3$-$C_6$ heterocycloalkyl.

With some embodiments of the photochromic compounds of the present invention, such as represented by Formula (IIb), $R^3$ and $R^4$ are each independently selected from the group consisting of, hydrogen; linear or branched $C_1$-$C_8$ alkyl; linear or branched $C_1$-$C_8$ haloalkyl; $C_3$-$C_6$ cycloalkyl; and the group $Y^2$.

With some embodiments of the photochromic compounds of the present invention, such as represented by Formula (IIb), B and B' are in each case independently selected from the group consisting of: unsubstituted aryl; aryl substituted with linear or branched $C_1$-$C_6$ alkoxy; aryl substituted with linear or branched $C_1$-$C_6$ perhaloalkyl; aryl substituted with morpholino; and aryl substituted with piperidino.

In accordance with some embodiments of the present invention, and with reference to Formula (IIb), at least one of $R^1$ and $R^2$ is independently the lengthening group $L^1$.

With some further embodiments of the present invention, for each lengthening group $L^1$ and $L^2$, represented by Formula (III), (a) $Q_1$, $Q_2$, and $Q_3$ for each occurrence, are independently selected from the group consisting of unsubstituted aryl, substituted aryl, unsubstituted cycloalkyl, and substituted cycloalkyl.

In accordance with some further embodiments, and independently for each group $L^1$ and $L^2$, represented by Formula (III), (b) each $S_1$, $S_2$, $S_3$, $S_4$, and $S_5$ is independently chosen for each occurrence from a spacer unit selected from (ii) or (iii) as described as follows. Each $S_1$, $S_2$, $S_3$, $S_4$, and $S_5$ of Formula (III), with some embodiments, is independently chosen for each occurrence from a spacer unit selected from, (ii) —N(Z)—, —C(Z)=C(Z)—, —C(Z)=N—, —C(Z')$_2$—C(Z')$_2$—, —N(Z)—C(Z')$_2$—, and a single bond, wherein Z for each occurrence is independently selected from the group consisting of hydrogen, $C_1$-$C_8$ alkyl, $C_3$-$C_6$ cycloalkyl and aryl, and Z' for each occurrence is independently selected from the group consisting of $C_1$-$C_8$ alkyl, $C_3$-$C_6$ cycloalkyl and aryl. Each $S_1$, $S_2$, $S_3$, $S_4$, and $S_5$ of Formula (III), with some embodiments, is independently chosen for each occurrence from a spacer unit selected from, (iii) —O—, —C(=O)—, —C≡C—, —N=N—, —S—, —S(=O)—, and straight-chain or branched $C_1$-$C_{12}$ alkylene residue, the $C_1$-$C_{12}$ alkylene residue being unsubstituted, mono-substituted by cyano or halogen, or poly-substituted by halogen.

In accordance with some further embodiments, and independently for each group $L^1$ and $L^2$, represented by Formula (III), (c) P for each occurrence is independently selected from the group consisting of hydrogen, hydroxy, amino, $C_2$-$C_8$ alkenyl, $C_2$-$C_8$ alkynyl, acryloyloxy, methacryloyloxy, 2-(acryloyloxy)ethylcarbamyl, 2-(methacryloyloxy) ethylcarbamyl, epoxy, carboxylic acid, carboxylic ester, acryloylamino, methacryloylamino, aminocarbonyl, $C_1$-$C_8$ alkyl aminocarbonyl, aminocarbonyl($C_1$-$C_8$)alkyl, $C_1$-$C_8$ alkyloxycarbonyloxy, halocarbonyl, aryl, hydroxy($C_1$-$C_8$) alkyl, $C_1$-$C_8$ alkyl, $C_1$-$C_8$ alkoxy, amino($C_1$-$C_8$)alkyl, $C_1$-$C_8$ alkylamino, di-($C_1$-$C_8$)alkylamino, $C_1$-$C_8$ alkyl($C_1$-$C_8$) alkoxy, $C_1$-$C_8$ alkoxy($C_1$-$C_8$)alkoxy, nitro, poly($C_1$-$C_8$)alkyl ether, ($C_1$-$C_8$)alkyl($C_1$-$C_8$)alkoxy($C_1$-$C_8$)alkyl, polyethyleneoxy, polypropyleneoxy, ethylene, acryloyl, acryloyloxy ($C_1$-$C_{18}$)alkyl, methacryloyl, methacryloyloxy($C_1$-$C_8$)alkyl, 2-chloroacryloyl, 2-phenylacryloyl, acryloyloxyphenyl, 2-chloroacryloylamino, 2-phenylacryloylaminocarbonyl, oxetanyl, glycidyl, cyano, isocyanato($C_1$-$C_{18}$)alkyl, itaconic acid ester, vinyl ether, and vinyl ester.

In accordance with some further embodiments, and independently for each group $L^1$ and $L^2$, represented by Formula (III), (b) each $S_1$, $S_2$, $S_3$, $S_4$, and $S_5$ is independently chosen for each occurrence from a spacer unit selected from: (ii) —N(Z)—, —C(Z)=C(Z)—, and a single bond, wherein Z for each occurrence is independently selected from the group consisting of hydrogen, $C_1$-$C_8$ alkyl, $C_3$-$C_6$ cycloalkyl and aryl, and Z' for each occurrence is independently selected from the group consisting of $C_1$-$C_8$ alkyl, $C_3$-$C_6$ cycloalkyl and aryl; and (iii), —C(=O)—, —C≡C—, and straight-chain or branched $C_1$-$C_6$ alkylene residue, the $C_1$-$C_6$ alkylene residue being unsubstituted, mono-substituted by cyano or halogen, or poly-substituted by halogen.

In accordance with some additional further embodiments, independently for each group $L^1$ and $L^2$ represented by Formula (III), (c) P for each occurrence is independently selected from hydrogen, hydroxy, amino, $C_2$-$C_8$ alkenyl, $C_2$-$C_8$ alkynyl, and aryl.

Examples of lengthening groups from which lengthening group $L^1$ and $L^2$ of the photochromic compounds of the present invention, such as represented by Formula (IIb), can be selected, include, but are not limited to, those disclosed at column 38, line 42 through column 51, line 20 of U.S. Pat. No. 9,334,439 B2, which disclosure is specifically incorporated herein by reference.

In accordance with some embodiments, the photochromic compounds of the present invention, such as represented by Formula (IIb), after formation thereof, can be subjected to one or more additional chemical reactions for purposes of modifying at least one of $R^1$, $R^2$, B and B', so as to be converted to or to be substituted with a lengthening group $L^1$ or $L^2$, as the case may be, and in each case as described previously herein with reference to Formula (III). Examples of additional chemical reactions that the photochromic compound(s), such as represented by Formula (IIb), can be subjected to include, but are not limited to, palladium-catalyzed cross couplings, etherifications, esterifications, amidations, and condensations.

The present invention also provides, with some embodiments, a photochromic compound represented by the following Formula (IV):

  Formula (IV)

With reference to Formula (IV), subscript n' is at least 2, such as from 2 to 100, or from 2 to 50, or from 2 to 25, or from 2 to 20, or from 2 to 15, or from 2 to 10, or from 2 to 8, or from 2 to 5, or from 2 to 4, or 2 or 3, in each case inclusive of the recited values.

With further reference to Formula (IV), the PC group or moiety, independently for each n', is a residue of a photochromic compound according to the present invention, such as represented by Formula (IIb), and as described previously herein.

With additional reference to Formula (IV), $L^y$ is a multivalent linking group selected from: (i) a first multivalent compound that is a multivalent polymer; and (ii) a second multivalent compound that is different than the first multivalent compound, the second multivalent compound being non-polymeric and comprising a residue selected from, a residue of a polyisocyanate, a residue of a polyol, a residue of a polycarboxylic acid, a residue of a polycarbonate functional material, and combinations thereof. As used herein, the term "non-polymeric" with regard to the second multivalent compound, from which $L^y$ of Formula (IV) can be selected, means it is free of repeating monomer units (or repeating monomer residues).

In accordance with some embodiments, and with further reference to Formula (IV), the multivalent polymer of the first multivalent compound, from which $L^y$ can be selected, is selected from multivalent polyurethane, multivalent polyester, multivalent polyether, multivalent poly(meth)acrylate, multivalent polyvinylalcohol, multivalent polycarbonate, multivalent polysiloxane, and multivalent cyclic polysiloxane. The multivalent polymers from which $L^y$ can be selected can be prepared in accordance with art-recognized methods from art-recognized materials including, but not limited to, art-recognized monomers. With some embodiments, (a) at least some of the monomers from which the polymer is prepared (and of which $L^y$ is a residue) have covalently bonded thereto one or more photochromic compounds according to the present invention; and/or (b) the resulting polymer (of which $L^y$ is a residue) is subsequently modified to include photochromic compounds according to the present invention bonded thereto. The multivalent polymers from which $L^y$ can be selected can, with some embodiments, have any suitable backbone architecture, such as but not limited to, alternating backbone architecture, block backbone architecture, random backbone architecture, and combinations thereof. The multivalent polymers from which $L^y$ can be selected can, with some further embodiments, have any suitable macro polymer architecture, such as but not limited to, linear polymer architecture, branched polymer architecture, comb polymer architecture, star polymer architecture, dendritic polymer architecture, and combinations thereof.

Classes of polyisocyanates that can be a residue of the second multivalent compound, from which $L^y$ of Formula (IV) can be selected, include, but are not limited to, aliphatic polyisocyanates, aromatic polyisocyanates, cycloaliphatic polyisocyanates, and heterocyclic polyisocyanates, in each case having at least 2 isocyanate groups, dimers of such polyisocyanates, trimers of such polyisocyanates, and mixtures of such polyisocyanates. Examples of polyisocyanates that can be a residue of the second multivalent compound, from which $L^y$ of Formula (IV) can be selected, include, but are not limited to, toluene-2,4-diisocyanate; toluene-2,6-diisocyanate; diphenyl methane-4,4'-diisocyanate; diphenyl methane-2,4'-diisocyanate; para-phenylene diisocyanate; biphenyl diisocyanate; 3,3'-dimethyl-4,4'-diphenylene diisocyanate; tetramethylene-1,4-diisocyanate; hexamethylene-1, 6-diisocyanate; 2,2,4-trimethyl hexane-1,6-diisocyanate; lysine methyl ester diisocyanate; bis(isocyanato ethyl)fumarate; isophorone diisocyanate; ethylene diisocyanate; dodecane-1,12-diisocyanate; cyclobutane-1,3-diisocyanate; cyclohexane-1,3-diisocyanate; cyclohexane-1,4-diisocyanate; methyl cyclohexyl diisocyanate; hexahydrotoluene-2, 4-diisocyanate; hexahydrotoluene-2,6-diisocyanate; hexahydrophenylene-1,3-diisocyanate; hexahydrophenylene-1, 4-diisocyanate; perhydrodiphenylmethane-2,4'-diisocyanate; perhydrodiphenylmethane-4,4'-diisocyanate, dimers thereof, trimers thereof, and mixtures thereof.

Classes of polyols that can be a residue of the second multivalent compound, from which $L^y$ of Formula (IV) can be selected, include, but are not limited to, aliphatic polyols, aromatic polyols, cycloaliphatic polyols, and heterocyclic polyols, in each case having at least 2 hydroxyl groups. Examples of polyols that can be a residue of the second multivalent compound, from which $L^y$ of Formula (IV) can be selected, include, but are not limited to, trimethylolpropane, di(trimethylolpropane), trimethylolethane, di(trimethylolethane), trishydroxyethylisocyanurate, pentaerythritol, di(pentaerythritol) ethylene glycol, propylene glycol, trimethylene glycol, butanediol, heptanediol, hexanediol, octanediol, 4,4'-(propane-2,2-diyl)dicyclohexanol, 4,4'-methylenedicyclohexanol, neopentyl glycol, 2,2,3-trimethylpentane-1,3-diol, 1,4-dimethylolcyclohexane, 2,2,4-trimethylpentane diol, 4,4'-(propane-2,2-diyl)diphenol, and 4,4'-methylenediphenol.

Classes of polycarboxylic acids that can be a residue of the second multivalent compound, from which $L^y$ of Formula (IV) can be selected, include, but are not limited to, aliphatic polycarboxylic acids, aromatic polycarboxylic acids, cycloaliphatic polycarboxylic acids, and heterocyclic polycarboxylic acids, in each case having at least 2 carboxylic acid groups and/or carboxylic acid ester groups. Examples of polycarboxylic acids that can be a residue of the second multivalent compound, from which $L^y$ of Formula (IV) can be selected, include, but are not limited to, benzene-1,2,4-tricarboxylic acid, phthalic acid, tetrahydrophthalic acid, hexahydrophthalic acid, endobicyclo-2,2,1,5-heptyne-2,3-dicarboxylic acid, tetrachlorophthalic acid, cyclohexanedioic acid, succinic acid, isophthalic acid, terephthalic acid, azelaic acid, maleic acid, trimesic acid, 3,6-dichlorophthalic acid, adipic acid, sebacic acid, and like multifunctional carboxylic acids.

Classes of polycarbonate functional materials/compounds that can be a residue of the second multivalent compound, from which $L^y$ of Formula (IV) can be selected, include, but are not limited to, aliphatic polycarbonate functional compounds, aromatic polycarbonate functional compounds, cycloaliphatic polycarbonate functional compounds, and heterocyclic polycarbonate functional compounds, in each case having at least 2 cyclic carbonate groups. The polycarbonate functional compounds can be prepared in accordance with art-recognized methods. In accordance with some embodiments, the polycarbonate functional compounds are prepared by heating oxirane functional precursor materials in the presence of carbon dioxide and an appropriate catalyst, such as a tetraalkyl ammonium iodide and/or tetraalkyl ammonium bromide, for example, tetrabutylammonium iodide and/or tetrabutylammonium bromide. In accordance with some further embodiments, the oxirane functional precursor material is prepared by reacting one more of a polyol with at least two moles of epichlorohydrin, so as to convert at least two of the hydroxyl groups of the polyol to oxirane functional groups. The polyol can, with some embodiments, be selected from those classes and examples of polyols as recited previously herein with regard to $L^y$.

In accordance with some embodiments of the photochromic compounds of the present invention, and as discussed previously herein, (a) some groups thereof, such as, but not limited to, $R^1$ independently for each n, and $R^2$ independently for each m, and (b) some of the substituents of the groups thereof, are in each case independently selected from a reactive substituent. If the photochromic compounds of the present invention include multiple reactive substituents, each reactive substituent can be independently chosen. Each reactive substituent, with some embodiments, independently is a terminal reactive substituent or a pendent reactive substituent.

Classes of reactive substituents from which each reactive substituent can be independently selected, include, but are not limited to: active hydrogen groups; groups that are reactive with active hydrogen groups; and ethylenically unsaturated and radically polymerizable groups. Examples of active hydrogen groups, from which each reactive substituent can be independently selected, include, but are not limited to: hydroxyl groups; thiol groups; carboxylic acid groups; sulfonic acid groups; primary amine groups; and secondary amine groups, including cyclic amine groups. Examples of groups that are reactive with active hydrogen groups, from which each reactive substituent can be independently selected, include, but are not limited to: isocyanate groups; isothiocyanate groups; oxirane (or epoxide) groups; thiirane (or thioepoxide) groups; aziridine groups; carboxylic acid ester groups; cyclic carboxylic acid ester groups; cyclic carboxylic acid anhydride groups; sulfonic acid ester groups; and cyclic carbonate groups. Examples of ethylenically unsaturated and radically polymerizable groups, from which each reactive substituent can be independently selected, include, but are not limited to: vinyl groups, including vinyl ether groups; halovinyl groups, such as 1-chlorovinyl; allyl groups, including allyl ether groups; acryl groups; and methacryl groups. Acryl groups and methacryl groups can be referred to collectively herein as (meth) acryl groups.

In accordance with some embodiments of the present invention, and for purposes of non-limiting illustration, further examples of ethylenically unsaturated and radically polymerizable groups, from which each reactive substituent can be independently selected, include, but are not limited to: acryl; methacryl; crotyl; 2-(methacryloxy)ethylcarbamyl; 2-(methacryloxy)ethoxycarbonyl; vinylphenyl, such as 4-vinylphenyl; vinyl; and 1-halovinyl, such as 1-chlorovinyl. As used herein, the terms acryloyl, methacryloyl, crotyl, 2-(methacryloxy)ethylcarbamyl, 2-(methacryloxy) ethoxycarbonyl, vinylphenyl, vinyl, and 1-halovinyl, refer to the following representative structures:

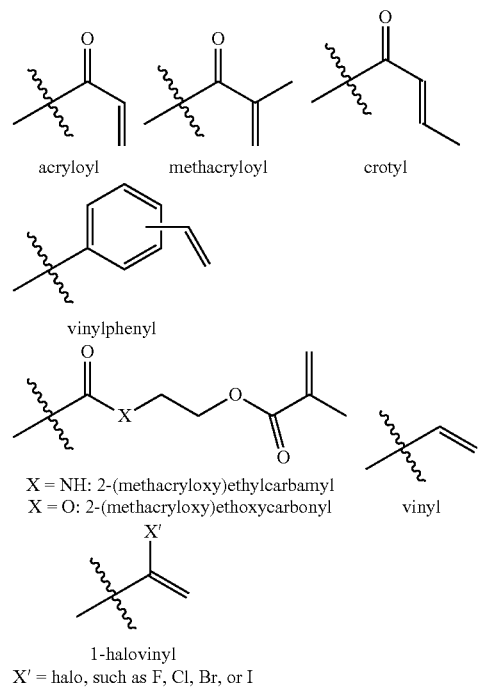

acryloyl   methacryloyl   crotyl vinylphenyl

X = NH: 2-(methacryloxy)ethylcarbamyl
X = O: 2-(methacryloxy)ethoxycarbonyl   vinyl 1-halovinyl
X' = halo, such as F, Cl, Br, or I A further description of reactive substituents that can be used in connection with the photochromic compounds of the present invention is provided at column 28, line 34 through column 33, line 49 of U.S. Pat. No. 9,028,728 B2, which disclosure is hereby specifically incorporated by reference herein.

As used herein, the term "polysiloxane" such as with regard to substituents of various groups of the photochromic compounds of the present invention, includes a material represented by the following Formula (G:

(G)

With reference to Formula (G), subscript t' is from 2 to 200, such as from 2 to 100, or 2 to 50, or from 2 to 25, or from 2 to 15, or from 2 to 10, or from 2 to 5, in each case inclusive of the recited values. With further reference to Formula (G): $R_{32}$ and $R_{33}$, for each t', are each independently selected from linear or branched $C_1$-$C_6$ alkyl and aryl; and $R_{34}$ is selected from hydrogen, linear or branched $C_1$-$C_6$ alkyl, and aryl. With some embodiments: $R_{32}$ and $R_{33}$ for each t', are each independently selected from methyl, ethyl, and phenyl; and $R_{34}$ is selected from hydrogen, methyl, ethyl, and phenyl.

As used herein, the term "polysiloxane" such as with regard to substituents of various groups of the photochromic compounds of the present invention, alternatively to or in addition to a material represented by Formula (G), includes a material represented by the following Formula (II):

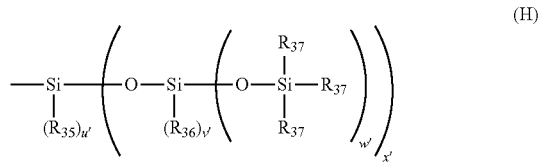

(H)

With reference to Formula (II), subscript u' is 0-2 and subscript x' is 1-3, provided that u'+x' is 3; and subscript v' is 0-2 and subscript w' is 1-3, provided that v'+w' is 3. With further reference to Formula (II), $R_{35}$ independently for each u', $R_{36}$ independently for each v' and each x', and each $R_{37}$ independently for each w' and each x', are in each case independently selected from linear or branched $C_1$-$C_6$ alkyl (such as, but not limited to, methyl and ethyl) and aryl (such as but not limited to phenyl).

With some embodiments, the photochromic compounds of the present invention, such as described with reference to Formulas (Ia), (Ib), (IIa), and/or (IIb) can each be used alone, or in combination with one or more other photochromic compounds. For example, the photochromic compounds of the present invention can be used in conjunction with one or more other photochromic compounds having activated absorption maxima within the range of 300 to 1000 nanometers. Further, the photochromic compounds according to the present invention can be used in conjunction with one or more complementary conventional polymerizable or compatiblized photochromic compounds, such as for example, those disclosed in U.S. Pat. No. 6,113,814 (at col. 2, line 39 to col. 8, line 41), and U.S. Pat. No. 6,555,028 (at col. 2, line 65 to col. 12, line 56), which disclosures are hereby specifically incorporated by reference herein.

The photochromic compounds of the present invention can be used in combination with a mixture of other photochromic compounds. For example, although not limiting herein, mixtures of photochromic compounds can be used to attain certain activated colors, such as a near neutral gray or near neutral brown. See, for example, U.S. Pat. No. 5,645,767, col. 12, line 66 to col. 13, line 19, which describes the parameters that define neutral gray and brown colors and which disclosure is specifically incorporated by reference herein.

Examples of classes of other photochromic compounds that can be used in combination with the photochromic compounds of the present invention, include, but are not limited to, indeno-fused naphthopyrans, naphtho[1,2-b]pyrans, naphtho[2,1-b]pyrans, spirofluoroeno[1,2-b]pyrans, phenanthrenopyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, thermally reversible photochromic compounds, and non-thermally reversible photochromic compounds, and mixtures thereof. Further examples of other photochromic compounds that can be used in combination with the photochromic compounds of the present invention include, but are not limited to, those disclosed at column 34, line 20 through column 35, line 13 of U.S. Pat. No. 9,028,728 B2, which disclosure is specifically incorporated by reference herein.

Figure 1B:
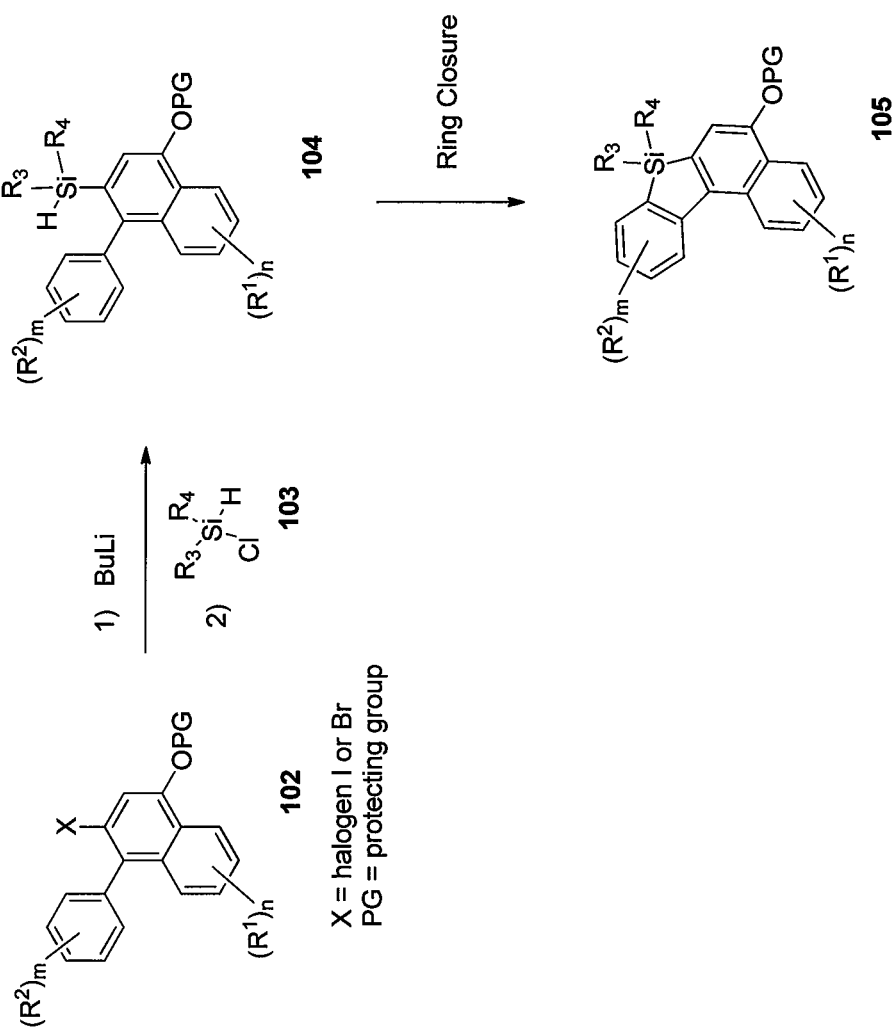
FIG. 1(b) is an illustrative representative second part (Part 2) of the general scheme, Scheme 1, of FIG. 1(a)
Figure 1C:
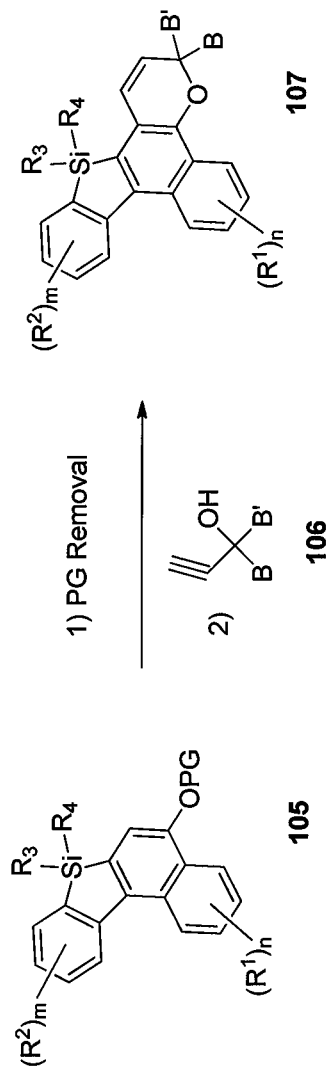
FIG. 1(c) is an illustrative representative third part (Part 3) of the general scheme, Scheme 1, of FIGS. 1(a) and 1(b).

Photochromic compounds according to the present invention can be prepared in accordance with art-recognized methods. For purposes of non-limiting illustration and with reference to FIGS. 1(a) through 1(c) of the drawings, a general synthetic scheme, Scheme 1, for the preparation of photochromic compounds according to the present invention is described as follows. Further detailed descriptions of the preparation of photochromic compounds of the present invention are provided further herein in the Examples. In FIGS. 1(a) through 1(c), the various groups, such as $R^1$, $R^2$, $R^3$, $R^4$, B, and B', and related subscripts, such as n and m, of the various intermediates, reactants, and/or compounds depicted, are each as described previously herein, and/or represent precursors of such groups.

With reference to FIG. 1(a), in a first step, an aryl ketone (101) is subjected to an art-recognized Stobbe Condensation, that involves reaction of aryl ketone (101) with dimethyl succinate (not shown) in the presence of potassium t-butoxide, which results in the formation of an intermediate (not shown), which can next undergo ring closure in acetic anhydride, resulting in the formation of intermediate (101).

The acetyl group (—C(O)CH$_3$) of intermediate (101) is next replaced with a protecting group (PG), such as a benzyl group, in accordance with art-recognized methods, which results in the formation of an intermediate having an —OPG group (not shown). The methyl carboxylate group (—C(O)—OCH$_3$) of the intermediate having an —OPG group is next converted to an amine group in accordance with the art-recognized Curtius Rearrangement, and this amine group is next converted to a halogen group (X) in accordance with the art-recognized Sandmeyer Reaction, which results in the formation of intermediate (102).

With reference to FIG. 1(b), intermediate (102) is next subjected to lithiation with a suitable lithium compound, such as butyllithium, followed by quenching with an $R_3$, $R_4$ substituted chlorosilane (103), or an $R_3$, $R_4$ substituted dichlorosilane (not shown), which results in the formation of intermediate (104). If an $R_3$, $R_4$ substituted dichlorosilane is used in place of the $R_3$, $R_4$ substituted chlorosilane (103), the resulting chlorosilane functional intermediate (not shown) is typically reduced by reaction with a suitable reducing agent, such as sodium borohydride or lithium aluminum hydride, prior to the subsequent ring closure step.

With further reference to FIG. 1(b), intermediate (104) can next be subjected to ring closure in accordance with art-recognized methods, such as described by Takai et al., J. Am. Chem. Soc. 2010, Vol. 132, No. 41, pp. 14324-14326; Takai et al., Org. Lett. 2014, Vol. 16, pp. 6492-6495; and/or US Patent Application Publication No. US 2016/0200639 A1. Subjecting intermediate (104) to ring closure results in the formation of intermediate (105).

With reference to FIG. 1(c), the protecting group (PG) of intermediate (105) is typically next removed in accordance with art-recognized methods, which results in the formation of an intermediate (not shown) having a hydroxyl group (—OH) in place of the —OPG group. The hydroxyl functional intermediate (not shown) is next reacted with propargyl alcohol (106) under art-recognized conditions, which results in the formation of compound (107), which is representative of some photochromic compounds according to the present invention, in which M is Si.

Photochromic germole fused ring compounds according to the present invention, such as benzo-germole fused naphthopyran compounds, can be prepared in accordance with the general procedures depicted in Scheme 1 of FIGS. 1(a)-1(c), with the $R_3$, $R_4$ substituted chlorosilane (103) of FIG. 1(b) being replaced, in some embodiments, with an $R_3$, $R_4$ substituted dichlorogermane. Use of an $R_3$, $R_4$ substituted dichlorogermane, typically requires the additional step of subjecting the resulting chlorogermane functional intermediate (not shown) to a reduction reaction using a suitable reducing agent, such as sodium borohydride or lithium aluminum hydride, prior to performing the ring closure step.

In accordance with the present invention there is also provided a photochromic composition, which includes at least one photochromic compound according to the present invention, such as represented by Formula (Ia), (Ib), (IIa), and/or (IIb), as described previously herein.

In accordance with some embodiments of the present invention, the photochromic composition includes: (i) an organic material, in which the organic material is at least one of a polymeric material, an oligomeric material, and/or a monomeric material; and (ii) a photochromic compound according to the present invention, which is incorporated into at least a portion of the organic material. The photochromic compound can be incorporated into a portion of the organic material by methods including, but not limited to, at least one of blending and/or bonding the photochromic compound with the organic material or a precursor of the organic material. As used herein with reference to the incorporation of photochromic compounds into an organic material, the terms "blending" and "blended" mean that the photochromic compound/material is intermixed or intermingled with the at least a portion of the organic material, but not bonded to the organic material. Further, as used herein with reference to the incorporation of photochromic compounds into an organic material, the terms "bonding" or "bonded" mean that the photochromic compound/material is linked, such as by one or more covalent bonds, to a portion of the organic material or a precursor thereof. For example, although not limiting herein, the photochromic material can be linked to the organic material through a reactive substituent.

In accordance with some embodiments of the present invention, when the organic material is a polymeric material, the photochromic compound can be incorporated into at least a portion of the polymeric material or at least a portion of the monomeric material or oligomeric material from which the polymeric material is formed. For example, photochromic compound(s) according to the present invention that have a reactive substituent can be bonded to an organic material such as a monomer, oligomer, or polymer having a group with which a reactive moiety may be reacted, or the reactive moiety can be reacted as a co-monomer in the polymerization reaction from which the organic material is formed, for example, in a co-polymerization process.

As discussed above, the photochromic compositions according to present invention can include an organic material chosen from a polymeric material, an oligomeric material and/or a monomeric material, with some embodiments. Examples of polymeric materials that can be used with the photochromic compositions of the present invention include, but are not limited to: poly(carbonate), copolymers of ethylene and vinyl acetate; copolymers of ethylene and vinyl alcohol; copolymers of ethylene, vinyl acetate, and vinyl alcohol (such as those that result from the partial saponification of copolymers of ethylene and vinyl acetate); cellulose acetate butyrate; poly(urethane); poly(acrylate); poly (methacrylate); epoxies; aminoplast functional polymers; poly(anhydride); poly(urea urethane); N-alkoxymethyl (meth)acrylamide functional polymers; poly(siloxane); poly (silane); and combinations and mixtures thereof. Further classes and examples of polymeric materials that can be used with the photochromic compositions of the present invention include, but are not limited to, those disclosed at column 39, line 45 through column 40, line 67 of U.S. Pat. No. 9,028,728 B2, which disclosure is specifically incorporated herein by reference.

With some further embodiments, the photochromic composition of the present invention further includes at least one of, a complementary photochromic material (including one or more of those other photochromic materials and compounds described previously herein), a photoinitiator, a thermal initiator, a polymerization inhibitor, a solvent, a light stabilizer, a heat stabilizer, a mold release agent, a rheology control agent, a leveling agent, a free radical scavenger, and/or an adhesion promoter.

In accordance with some embodiments, the photochromic composition according to the present invention is a photochromic coating composition. Photochromic coating compositions according to some embodiments of the present invention include: a photochromic material according to the present invention, such as described previously herein with regard to Formula (Ia), (Ib), (IIa), or (IIb); a resin composition that is optionally curable; and optionally a solvent. The photochromic coating composition can be in the form of art-recognized liquid coatings and powder coatings. The photochromic coating compositions of the present invention can be thermoplastic or thermosetting coating compositions. In an embodiment, the photochromic coating composition is a curable or thermosetting coating composition.

The curable resin composition of the curable photochromic coating compositions according to some embodiments of the present invention include: a first reactant (or component) having functional groups, e.g., an epoxide functional polymer reactant; and a second reactant (or component) that is a crosslinking agent having functional groups that are reactive towards and that can form covalent bonds with the functional groups of the first reactant. The first and second reactants of the curable resin composition of the curable photochromic coating composition can each independently include one or more functional species, and are each present in amounts sufficient to provide cured photochromic coatings having a desirable combination of physical properties, e.g., smoothness, optical clarity, solvent resistance, and hardness.

Examples of curable resin compositions that can be used with the curable photochromic coating compositions according to the present invention include, but are not limited to: curable resin compositions including epoxide functional polymer (e.g., (meth)acrylic polymers containing residues of glycidyl (meth)acrylate) and epoxide reactive crosslinking agent (e.g., containing active hydrogens, such as hydroxyls, thiols and amines); and curable resin compositions including active hydrogen functional polymer (e.g., hydroxy, thiol, and/or amine functional polymer) and capped (or blocked) isocyanate functional crosslinking agent. By "capped (or blocked) isocyanate functional crosslinking agent" is meant a crosslinking agent having two or more capped isocyanate groups that can decap (or deblock) under cure conditions (e.g., at elevated temperature) to form free isocyanate groups and free capping groups. The free isocyanate groups formed by decapping of the crosslinking agent are preferably capable of reacting and forming substantially permanent covalent bonds with the active hydrogen groups of the active hydrogen functional polymer (e.g., with the hydroxy groups of a hydroxy functional polymer). Further examples of curable resin compositions that can be used with the curable photochromic coating compositions according to the present invention include, but are not limited to, those disclosed in: paragraphs [0176] through [0190] of WO 2016/142496 A1; and paragraphs [0005], [0037] through [0051], [0056] through [0059], and [0063] through [0065] of WO 2017/030545 A1, which disclosures are specifically incorporated herein by reference.

Curable photochromic coating compositions according to the present invention can, with some embodiments, optionally contain additives such as waxes for flow and wetting, flow control agents, e.g., poly(2-ethylhexyl)acrylate, adjuvant resin to modify and optimize coating properties, antioxidants and ultraviolet (UV) light absorbers. Examples of useful antioxidants and UV light absorbers include those available commercially from BASF under the trademarks IRGANOX and TINUVIN. These optional additives, when used, are typically present in amounts up to 20 percent by weight (e.g., from 0.5 to 10 percent by weight), based on total weight of resin solids of the curable resin composition.

Photochromic compositions, photochromic articles and photochromic coating compositions according to the present invention can, with some embodiments, further include art-recognized additives that aid or assist in the processing and/or performance of the compositions or articles. Non-limiting examples of such additives include photoinitiators, thermal initiators, polymerization inhibitors, solvents, light stabilizers (such as, but not limited to, ultraviolet light absorbers and light stabilizers, such as hindered amine light stabilizers (HALS)), heat stabilizers, mold release agents, rheology control agents, leveling agents (such as, but not limited to, surfactants), free radical scavengers, adhesion promoters (such as hexanediol diacrylate and coupling agents), and combinations and mixtures thereof.

The photochromic compounds of the present invention can be used in amounts (or ratios) such that the compositions, organic material or substrate (e.g., photochromic articles and photochromic coatings) into which the photochromic compounds are incorporated or otherwise connected exhibits desired optical properties. With some embodiments, the amount and types of photochromic material can be selected such that the composition, organic material or substrate is clear or colorless when the photochromic compound is in the closed-form (e.g., in the bleached or unactivated state), and can exhibit a desired resultant color when the photochromic compound (such as a photochromic indeno-fused phenanthrenopyran of the present invention) is in the open-form (e.g., when activated by actinic radiation). The precise amount of the photochromic material that is utilized in the various photochromic compositions and articles described herein is not critical provided that a sufficient amount is used to produce the desired effect. The particular amount of the photochromic material used can depend on a variety of factors, such as but not limited to, the absorption characteristics of the photochromic compound, the color and intensity of the color desired upon activation, and the method used to incorporate or connect the photochromic material to the substrate. Photochromic compositions according to some embodiments of the present invention can include the photochromic material according to the present invention, including the compounds represented by Formula (Ia), (Ib), (IIa), or (IIb) in an amount of from 0.01 to 40 weight percent, or from 0.05 to 15, or from 0.1 to 5 weight percent, based on the weight of the photochromic composition. For purposes of further non-limiting illustration, the amount of the photochromic compound/material including the compounds represented by Formula (Ia), (Ib), (IIa), or (IIb) that is incorporated into an organic material can range from 0.01 to 40 weight percent, or from 0.05 to 15, or from 0.1 to 5 weight percent, based on the weight of the organic material.

The present invention also relates to photochromic articles that include one or more photochromic compounds according to the present invention, such as represented by Formula (Ia), (Ib), (IIa), or (IIb). The photochromic articles are, with some embodiments, prepared by art-recognized methods, such as by imbibition methods, cast-in-place methods, coating methods, in-mold coating methods, over-mold methods, and lamination methods.

With some embodiments, the photochromic articles are selected from ophthalmic articles, display articles, windows, mirrors, and active liquid crystal cell articles, and passive liquid crystal cell articles.

In accordance with some further embodiments, the photochromic articles of the present invention are ophthalmic articles, and the ophthalmic articles are selected from corrective lenses, non-corrective lenses, contact lenses, intraocular lenses, magnifying lenses, protective lenses, and visors.

With some additional embodiments, the photochromic articles of the present invention are display articles, and the display articles are selected from screens, monitors, and security elements.

The present invention is more particularly described in the following examples, which are intended as illustrative only, since numerous modifications and variations therein will be apparent to those skilled in the art.

EXAMPLES

The following examples are provided in Parts 1 and 2, which are briefly summarized as follows. In Part 1 there are provided descriptions of the synthesis of a photochromic compound according to the present invention (Example 1)

and a comparative photochromic compound (CE-1). In Part 2 there is provided a description of an evaluation of the photochromic performance of the photochromic compound according to the present invention, and the comparative photochromic compound.

Part 1: Synthesis of Representative and Comparative Photochromic Compounds

Example 1

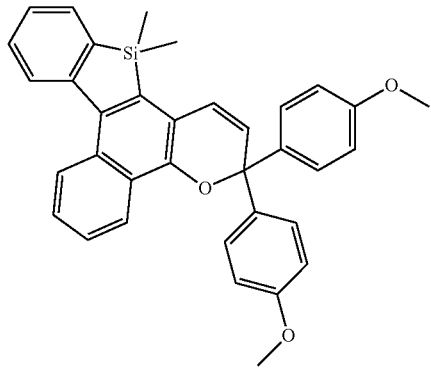

(201)

Step 1

While stirring under nitrogen, 2-(2-bromophenyl)furan (2.0 g) and cesium fluoride (5.10 g) were dissolved in 20 ml of acetonitrile. To this was added a solution of 2-(trimethylsilyl)phenyl trifluoromethanesulfonate (4.0 g) in 15 ml of acetonitrile dropwise over a period of 3 hours. The reaction mixture was allowed to stir for 48 hours at room temperature. The solvent was removed under reduced pressure and the residue purified by silica gel chromatography to give 1-(2-bromophenyl)-1,4-dihydro-1,4-epoxynaphthalene, as a colorless oil (3.65 g).

Step 2

The 1-(2-bromophenyl)-1,4-dihydro-1,4-epoxynaphthalene product of Step 1 was dissolved in tetrahydrofuran (50 mL), and p-toluenesolfunic acid (0.5 g) was added thereto. The resulting solution was heated to reflux for 5 hours during which additional p-toluenesulfonic acid (0.5 g) was added. The solution was cooled to room temperature, the solvent was removed under reduced pressure, and the residue was purified by silica gel chromatography to give 4-(2-bromophenyl)naphthalen-1-ol, as an off-white solid (3.22 g).

Step 3

While stirring under a nitrogen atmosphere, the 4-(2-bromophenyl)naphthalen-1-ol product of Step 2 (3.40 g), benzyl chloride (2.16 g) and potassium carbonate (3.15 g) were added to dimethylformamide (50 mL), then heated to 60° C. for 4 hours, cooled, then extracted with ethyl acetate. The organic layer was washed several times with water, dried with magnesium sulfate and the solvent was removed under reduced pressure. The residue was purified by silica gel chromatography to give 1-(benzyloxy)-4-(2-bromophenyl)naphthalene as a colorless solid (4.43 g).

Step 4

The 1-(benzyloxy)-4-(2-bromophenyl)naphthalene product of Step 3 was dissolved in anhydrous tetrahydrofuran (40 mL) and cooled to –78° C. under nitrogen. Butyl-lithium (7 mL) was added dropwise followed by chlorodimethylsilane (1.88 mL) in tetrahydrofuran (10 mL). The reaction mixture was allowed to warm to room temperature, then held at such temperature for 4 hours. Aqueous ammonium chloride was added and the mixture was extracted with ethyl acetate. The organic layers were dried with magnesium sulfate and concentrated under reduced pressure. The residue was purified by silica gel chromatography to give (2-(4-(benzyloxy)naphthalene-1-yl)phenyl)dimethylsilane, as a colorless oil (3.52 g), confirmed by mass spectroscopy.

Step 5

The (2-(4-(benzyloxy)naphthalene-1-yl)phenyl)dimethylsilane product of Step 4 (3.2 g) was dissolved in dioxane (20 mL) and sparged with nitrogen for 15 minutes. Tris(triphenylphosphine)rhodium(I) chloride (0.40 g) was added and the reaction mixture was heated to reflux, which was held for 5 hours. After cooling, the cooled mixture was poured into approximately 300 mL of a 2:1 water/ethyl acetate mixture. The organic layer was isolated, dried with sodium sulfate and concentrated under reduced pressure. The residue was purified by silica gel chromatography to give 5-(benzyloxy)-7,7-dimethyl-7H-benzo[b]naphtha[1,2-d]silole, as a colorless solid (2.15 g), which is represented by the following Formula (202):

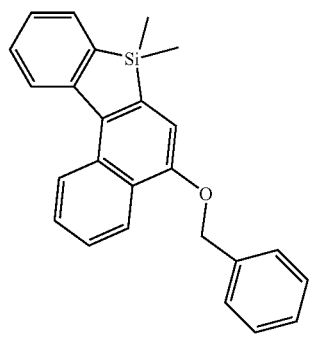

(202)

Step 6

While stirring under nitrogen, the 5-(benzyloxy)-7,7-dimethyl-7H-benzo[b]naphtha[1,2-d]silole product of Step 5 (2.15 g), palladium on carbon (0.20 g) and ammonium formate (1.50 g) were suspended in dimethylformamide (25 mL), heated to 70° C. for 3 hours, then allowed to cool. The reaction mixture was poured into approximately 300 mL of a 2:1 water/ethyl acetate mixture. The organic layer was separated, dried with sodium sulfate, filtered over CELITE diatomaceous earth and concentrated under reduced pressure. The residue was purified by silica gel chromatography to give a colorless solid (0.61 g) having an NMR spectrum consistent with 7,7-dimethyl-7H-benzo[b]naphtha[1,2-d]silol-5-ol.

Step 7

While stirring under nitrogen, the 7,7-dimethyl-7H-benzo[b]naphtha[1,2-d]silol-5-ol product of Step 6 (0.45 g), 1,1-bis-(4-methoxyphenyl)prop-2-yn-1-ol (0.52 g) and p-toluenesulfonic acid (0.01 g) were combined in dichloromethane (25 mL) and stirred at room temperature for 4 hours. The solution was then washed with brine, dried with sodium sulfate, and concentrated under reduced pressure. The residue was purified by reverse phase chromatography and recrystallized from acetonitrile to give 3,3-bis(4-methoxyphenyl)-13,13-dimethyl-3,13-dihydrobenzo[h]benzo[4,5]silol[2,3-f]chromene, (0.22 g), confirmed by mass spectroscopy, as represented by Formula (201) shown above (prior to Step 1).

Comparative Example 1 (CE-1)

Using the procedure described in Comparative Example CE3 of US Patent Application Publication No. US 2006/0226402 A1,3,3-di(4-methoxyphenyl)-13,13-dimethyl-3H, 13H-benz[p]-indeno[2',3':3,4]naphtho[1,2-b]pyran was prepared, as represented by the following Formula (203):

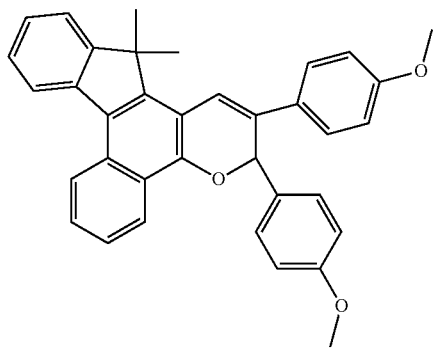

(203)

Part 2: Photochromic Properties
Part 2A—Preparation of Photochromic Test Squares Test squares (or specimens/samples) containing the photochromic compounds of Example 1 or CE-1 were prepared in accordance with the following description. Test squares including the photochromic compound of Example 1 are referred to herein as Example-A, and test squares including the photochromic compound of CE-1 are referred to herein as CE-A.

For each compound of Example 1 and CE-1, a quantity thereof calculated to yield a $1.5 \times 10^{-3}$ M solution was dissolved in 50 grams of a monomer blend of 4 parts ethoxylated bisphenol A dimethacrylate (BPA 2E0 DMA), 1 part poly(ethylene glycol) 600 dimethacrylate, and 0.033 weight percent 2,2'-azobis(2-methylpropionitrile), with gentle heating. After a clear solution was obtained, each sample was degassed in a vacuum oven for 5-10 minutes at 25 torr then poured into a flat sheet mold having an interior dimension of 2.2 mm+/−0.3 mm×6 inch (15.24 cm)×6 inch (15.24 cm). The mold was sealed and placed in a horizontal airflow, programmable oven set to ramp from 40° C. to 95° C. over 5 hours, hold at 95° C. for 3 hours, ramp down to 60° C. over 2 hours, and then hold at 60° C. for 16 hours. After curing, the mold was opened, and each polymer sheet was cut into 2 inch×2 inch (5.1 cm×5.1 cm) test squares using a diamond blade saw.

Part 2B—Photochromic Response Testing

Prior to response testing on an optical bench, the test squares produced as described in Part 2A, were conditioned by exposure to 365 nm ultraviolet light for 10 minutes at a distance of about 10 cm from the source to pre-activate the photochromic compounds in the samples. The UVA irradiance at the sample surface was measured with a Licor Model Li-1800 spectroradiometer and found to be 13.6 W/m². The samples were then placed under a halogen lamp (500 W, 120V) for about 10 minutes at a distance of about 30 cm from the lamp in order to bleach, or inactivate, the photochromic compounds in the samples. The illuminance was found to be 47 Klux. The samples were then placed under a yellow fluorescent lamp (12W, 120V) for about 30 minutes at a distance of about 10 cm from the lamp, in order to further bleach, or inactivate, the photochromic compounds in the samples. The illuminance at the sample was found to be 17 Klux. The samples were then kept in a dark environment for at least 1 hour prior to testing, in order to cool and allow the photochromic compounds to continue to fade back to a ground state.

The optical bench was fitted with a Newport Model #67005 300 W Xenon arc lamp and Model 69911 power supply, a Vincent Associates (Model VS25S2ZM0R3 with VMM-D4 controller) high-speed computer controlled shutter, a Schott 3 mm KG-2 band-pass filter, which removed short wavelength radiation, a neutral density filter(s) to attenuate light from the xenon lamp, a fused silica condensing lens for beam collimation, and a fused silica water cell/sample holder for maintaining sample temperature. The temperature in the water cell was controlled with a pumped water circulation system in which the water passed through copper coils that were placed in the reservoir of a chiller unit. The water cell used to hold test samples contained fused silica sheets on the front and back facings in order to eliminate spectral change of the activation or monitoring light beams. The filtered water passing through the water cell was maintained at 23° C.±0.2° C. for photochromic response testing. A Newport Model 68945 Digital Exposure Timer was used to further control the intensity of the xenon arc lamp during activation of the sample.

A custom broadband halogen light source for monitoring response measurements was positioned in a perpendicular manner to a surface of the cell assembly. Increased signal of shorter visible wavelengths was obtained from a 100 W tungsten halogen lamp (controlled via a TDK-Lambda Zup36-12 power supply) by collecting and re-combining separately filtered light through a bifurcated fiber assembly. This monitoring light, after passing through the sample, was refocused into a 2-inch integrating sphere and fed to an Ocean Optics S2000 spectrophotometer by fiber optic cables. Ocean Optics SpectraSuite and a proprietary software package were used to measure response and control the operation of the optical bench.

Irradiance for response testing of the samples on the optical bench was established at the sample surface using an International Light Research Radiometer, Model IL-1700 with a detector system comprising a Model SED033 detector, B Filter and diffuser. The output display of the radiometer was corrected (factor values set) against a Licor 1800-02 Optical Calibration Calibrator in order to display values representing W/m² UVA. The irradiance at the sample point for initial response testing was set at to 3.0 W/m² UVA and approximately 8.6 Klux illuminance. Adjusting the output of the filtered xenon arc lamp was accomplished by increasing or decreasing the current to the lamp through the controller and/or by adding or removing neutral density filters in the light path. The test samples were exposed to the activation light at a 31° angle normal to its surface while being perpendicular to the monitoring light.

Samples were activated in the 23° C. controlled water cell for 30 minutes, then allowed to fade under room light conditions until the change in optical density of the activated sample faded to ⅛ (or 0.125) of its highest darkened (saturated) state or for a maximum of 30 minutes of fade.

The $\lambda_{max\text{-}vis}$ is the wavelength in the visible spectrum at which the maximum absorption of the activated form of the photochromic compound occurs. The $\lambda_{max\text{-}vis}$ was determined by testing the activated photochromic test squares in a Varian Cary 4000 UV-Visible spectrophotometer.

The change in optical density (ΔOD) from the bleached state to the darkened state was determined by establishing the initial transmittance at $\lambda_{max\text{-}vis}$, opening the shutter from the Xenon lamp to provide ultraviolet radiation to change the test lens from the bleached state to an activated (i.e., darkened) state. Data was collected at selected intervals of time, measuring the transmittance at the $\lambda_{max\text{-}vis}$, and calculating the change in optical density according to the formula: $\Delta OD=\log(\% Tb/\% Ta)$, where % Tb is the percent transmittance in the bleached state, % Ta is the percent transmittance in the activated state and the logarithm is to the base 10. The $\Delta OD/Min$, which represents the sensitivity of the photochromic compound's response to UV light, was measured over the first five (5) seconds of UV exposure, then expressed on a per minute basis. The results of photochromic performance testing are summarized in the following Table 1.

TABLE 1

| Example | $\lambda_{max\text{-}vis}$ (nm) | Sensitivity ($\Delta OD/Min$) | $\Delta OD$ at saturation |
|---|---|---|---|
| A | 552 | 0.74 | 1.56 |
| CE-A | 558 | 0.67 | 0.86 |

With reference to Table 1, the photochromic performance data indicate that photochromic compounds according to the present invention, such as benzo-silole fused naphthopyrans, of which Example 1 is a non-limiting example, provide desirably higher sensitivity and optical density at saturation, as compared to comparative photochromic indeno fused naphthopyrans, such as represented by CE-1.

In addition to photochromic performance, extinction coefficients were calculated for the photochromic compounds of Example 1 and CE-1. Absorbance data was collected on the unactivated photochromic compounds, subtracting the contribution of the polymeric matrix, and extinction coefficients were determined by applying Beer's Law using the thickness of the test squares and the concentration of the photochromic compounds therein. The results are summarized in the following Table 2.

TABLE 2

| Example | Extinction coeff at 390 nm |
|---|---|
| 1 | 11,300 |
| CE-1 | 6,646 |

With reference to Table 2, photochromic compounds according to the present invention, such as benzo-silole fused naphthopyrans, of which Example 1 is a non-limiting example, desirably exhibit hyperchromaticity, and correspondingly more efficiently absorb the radiation required to activate the photochromic compound, as compared to comparative photochromic indeno fused naphthopyrans, such as CE-1.

The present invention can be further characterized by one or more of the following non-limiting clauses 1-15.

Clause 1: A photochromic compound having a core fused ring structure represented by the following Formula (Ia),

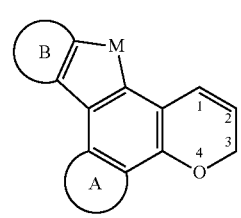

(Ia)

wherein M comprises Si or Ge;
Ring A and Ring B each independently comprise aryl or heteroaryl; and
the photochromic compound is a thermally reversible photochromic compound.

Clause 2: The photochromic compound of clause 1, wherein the core fused ring structure is represented by the following Formula (Ib),

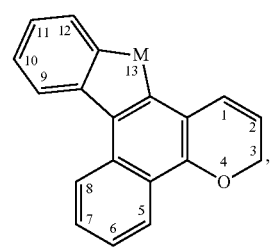

(Ib)

wherein M comprises Si or Ge; and
the photochromic compound is a thermally reversible photochromic compound.

Clause 3: The photochromic compound of clauses 1 or 2, wherein the photochromic compound is represented by the following Formula (IIa),

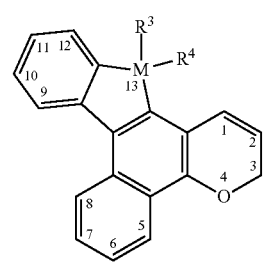

(IIa)

wherein M comprises Si or Ge;
the photochromic compound is a thermally reversible photochromic compound; and
$R^3$ and $R^4$ are each independently selected from the group consisting of,
(i) hydrogen, halogen, cyano, nitro, substituted or unsubstituted linear or branched $C_1$-$C_{20}$ alkyl, substituted or unsubstituted $C_3$-$C_{10}$ cycloalkyl, substituted or unsubstituted $C_3$-$C_{10}$ heterocycloalkyl, allyl, substituted or unsubstituted aryl, or substituted or unsubstituted heteroaryl,
wherein each alkyl substituent, each cycloalkyl substituent, each heterocycloalkyl substituent, each aryl substituent, and each heteroaryl substituent, is in each case independently selected from the group consisting of hydroxyl, halogen, cyano, nitro, linear or branched $C_1$-$C_{20}$ alkyl, linear or branched $C_1$-$C_{20}$ haloalkyl, linear or branched $C_1$-$C_{20}$ perhaloalkyl, $C_3$-$C_{10}$ cycloalkyl, $C_3$-$C_{10}$ heterocycloalkyl, aryl, heteroaryl, —O—$R_{10}$', —S—$R_{10'}$, —C(O)—$R_{10}$', —C(O)—O$R_{10}$', —OC(O)—$R_{10'}$, —OC(O)O—$R_{10'}$, —Si(O$R_{10'}$)$_w$($R_{10'}$)$_t$, polysiloxane, —N($R_{11}$')$R_{12}$', and combinations thereof, where w, t, each $R_{10}$', $R_{11}$', and $R_{12}$' are each independently as described as follows;

(ii) —O—$R_{10}$', —S—$R_{10'}$, —C(O)—$R_{10}$', —C(O)O$R_{10}$', —OC(O)—$R_{10'}$, —OC(O)O—$R_{10'}$, —Si(O$R_{10'}$)$_w$($R_{10'}$)$_t$, or polysiloxane, wherein each $R_{10}$' independently is hydrogen, linear or branched $C_1$-$C_{20}$ alkyl, linear or branched $C_1$-$C_{20}$ haloalkyl, linear or branched $C_1$-$C_{20}$ perhaloalkyl, aryl, heteroaryl, phenyl($C_1$-$C_{20}$)alkyl, mono($C_1$-$C_{20}$)alkyl substituted phenyl($C_1$-$C_{20}$)alkyl, mono($C_1$-$C_{20}$) alkoxy substituted phenyl($C_1$-$C_{20}$)alkyl, ($C_1$-$C_{20}$) alkoxy($C_2$-$C_{20}$)alkyl, $C_3$-$C_{10}$ cycloalkyl, mono($C_1$-$C_{20}$)alkyl substituted $C_3$-$C_{10}$ cycloalkyl, $C_3$-$C_{10}$ heterocycloalkyl, or polysiloxane, and w and t are each independently 0 to 3, provided that w+t is 3;

(iii) —N($R_{11}$')$R_{12}$', wherein $R_{11}$' and $R_{12}$' are each independently hydrogen, linear or branched $C_1$-$C_{20}$ alkyl, phenyl, naphthyl, furanyl, benzofuran-2-yl, benzofuran-3-yl, thienyl, benzothien-2-yl, benzothien-3-yl, dibenzofuranyl, dibenzothienyl, benzopyridyl, fluorenyl, $C_1$-$C_{20}$ alkylaryl, $C_3$-$C_{10}$ cycloalkyl, $C_4$-$C_{20}$ bicycloalkyl, $C_5$-$C_{20}$ tricycloalkyl or linear or branched $C_1$-$C_{20}$ alkoxyalkyl, wherein the aryl group is phenyl or naphthyl, or $R_{11}$' and $R_{12}$' come together with the nitrogen atom to form a ring; and (iv) a group $Y^2$; or (v) $R^3$ and $R^4$ together form a Spiro substituent selected from the group consisting of a substituted or unsubstituted spiro-carbocyclic ring containing 3 to 10 carbon atoms, a substituted or unsubstituted spiro-heterocyclic ring containing 1 or 2 oxygen atoms and 3 to 10 carbon atoms including the spirocarbon atom, the spiro-carbocyclic ring and spiro-heterocyclic ring being annellated with 0, 1 or 2 benzene rings, each spiro-ring substituent independently being linear or branched $C_1$-$C_{20}$ alkyl, wherein $Y^2$ comprises at least one residue of a ring-opened cyclic monomer, wherein each ring-opened cyclic monomer is independently selected from the group consisting of a ring-opened cyclic ester monomer and a ring-opened cyclic carbonate monomer.

Clause 4: The photochromic compound of clause 3, wherein the photochromic compound is represented by the following Formula (IIb),

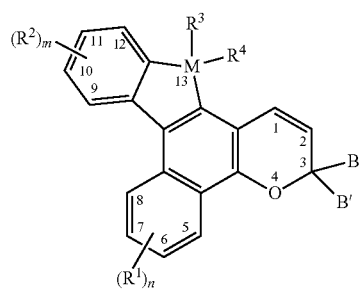

(IIb)

n is 1 to 4, and m is 1 to 4;

$R^1$ independently for each n, and $R^2$ independently for each m, are each independently selected from the group consisting of, (1) hydrogen;
(2) cyano;
(3) a reactive substituent;
(4) a lengthening group $L^1$;
(5) halogen selected from the group consisting of fluoro, chloro, and bromo;
(6) linear or branched $C_1$-$C_{20}$ alkyl;
(7) linear or branched $C_1$-$C_{20}$ haloalkyl;
(8) linear or branched $C_1$-$C_{20}$ perhaloalkyl;
(9) substituted or unsubstituted $C_3$-$C_{10}$ cycloalkyl;
(10) —B(O$R_{30}$)(O$R_{31}$),
wherein $R_{30}$ and $R_{31}$ are each independently selected from the group consisting of hydrogen and linear or branched $C_1$-$C_{20}$ alkyl, or $R_{30}$ and $R_{31}$ together form a 5- or 6-membered ring including the boron atom;
(11) a group $Y^1$;
(12) substituted or unsubstituted aryl;
(13) substituted or unsubstituted heterocycloalkyl;
(14) substituted or unsubstituted heteroaryl;
wherein each cycloalkyl substituent, each heterocycloalkyl substituent, each aryl substituent, and each heteroaryl substituent, is in each case independently selected from the group consisting of hydroxyl, halogen, cyano, linear or branched $C_1$-$C_{20}$ alkyl, linear or branched $C_1$-$C_{20}$ haloalkyl, linear or branched $C_1$-$C_{20}$ perhaloalkyl, $C_3$-$C_{10}$ cycloalkyl, $C_3$-$C_{10}$ heterocycloalkyl, aryl, heteroaryl, the reactive substituent, —O—$R_{10}$', —S—$R_{10'}$, —C(O)—$R_{10}$', —C(O—$R_{10}$', —OC(O)—$R_{10'}$, —OC(O)O—$R_{10'}$, —C(O)N($R_{10'}$)$R_{10'}$, —N($R_{10'}$)C(O)N($R_{10'}$)($R_{10'}$), —Si(O$R_{10'}$)$_w$($R_{10'}$)$_t$, polysiloxane, —N($R_{11}$')$R_{12}$', and combinations thereof, where w, t, each $R_{10}$', $R_{11}$', and $R_{12}$' are each independently as described as follows;

(15) —O—$R_{10}$', —S—$R_{10'}$, —C(O)—$R_{10}$', —C(O)l$R_{10}$', —OC(O)—$R_{10'}$, —OC(O)O—$R_{10'}$, —C(O)N($R_{10'}$)$R_{10'}$, —N($R_{10'}$)C(O)N($R_{10'}$)($R_{10'}$), —Si(O$R_{10'}$)$_w$($R_{10'}$)$_t$, or polysiloxane, wherein each $R_{10}$' independently is hydrogen, linear or branched $C_1$-$C_{20}$ alkyl, linear or branched $C_1$-$C_{20}$ haloalkyl, linear or branched $C_1$-$C_{20}$ perhaloalkyl, aryl, heteroaryl, phenyl($C_1$-$C_{20}$)alkyl, mono($C_1$-$C_{20}$)alkyl substituted phenyl($C_1$-$C_{20}$)alkyl, mono($C_1$-$C_{20}$) alkoxy substituted phenyl($C_1$-$C_{20}$)alkyl, ($C_1$-$C_{20}$) alkoxy($C_2$-$C_{20}$)alkyl, $C_3$-$C_{10}$ cycloalkyl, mono($C_1$-$C_{20}$)alkyl substituted $C_3$-$C_{10}$ cycloalkyl, $C_3$-$C_{10}$ heterocycloalkyl, or polysiloxane, and w and t are each independently 0 to 3, provided that w+t is 3;

(16) a polyether represented by the following Formula (a),

(a)

wherein for Formula (a), p is 1 to 100, $R_8$ independently for each p is linear or branched $C_1$-$C_{20}$ alkylene, and $R_8$' is selected from the group consisting of hydrogen, linear or branched $C_1$-$C_{20}$ alkyl, and the reactive substituent; and

(17) —N($R_{11}'$)$R_{12}'$, wherein $R_{11}'$ and $R_{12}'$ are each independently hydrogen, linear or branched $C_1$-$C_{20}$ alkyl, phenyl, naphthyl, furanyl, benzofuran-2-yl, benzofuran-3-yl, thienyl, benzothien-2-yl, benzothien-3-yl, dibenzofuranyl, dibenzothienyl, benzopyridyl, fluorenyl, $C_1$-$C_{20}$ alkylaryl, $C_3$-$C_{10}$ cycloalkyl, $C_4$-$C_{20}$ bicycloalkyl, $C_5$-$C_{20}$ tricycloalkyl or linear or branched $C_1$-$C_{20}$ alkoxyalkyl, wherein the aryl group is phenyl or naphthyl, or $R_{11}'$ and $R_{12}'$ come together with the nitrogen atom to form a ring;

M is Si or Ge;

$R^3$ and $R^4$ are each independently selected from the group consisting of,
  (i) hydrogen, halogen, cyano, nitro, substituted or unsubstituted linear or branched $C_1$-$C_{10}$ alkyl, substituted or unsubstituted $C_3$-$C_7$ cycloalkyl, substituted or unsubstituted $C_3$-$C_7$ heterocycloalkyl, allyl, substituted or unsubstituted phenyl, or substituted or unsubstituted heteroaryl,
    wherein each alkyl substituent, each cycloalkyl substituent, each heterocycloalkyl substituent, each phenyl substituent, and each heteroaryl substituent, is in each case independently selected from the group consisting of hydroxyl, halogen, cyano, nitro, linear or branched $C_1$-$C_{10}$ alkyl, linear or branched $C_1$-$C_{10}$ haloalkyl, linear or branched $C_1$-$C_{10}$ perhaloalkyl, $C_3$-$C_7$ cycloalkyl, $C_3$-$C_7$ —O—$R_{10}'$, —S—$R_{10}'$, —C(O)—$R_{10}'$, —C(O)—O$R_{10}'$, and combinations thereof, where each $R_{10}'$ of —O—$R_{10}'$, —S—$R_{10}'$, —C(O)—$R_{10}'$, and —C(O)—O$R_{10}'$, is independently as described as follows;
  (ii) —O—$R_{10}'$, —S—$R_{10}'$, —C(O)—$R_{10}'$, —C(O)—O$R_{10}'$, —OC(O)—$R_{10}'$, —OC(O)O—$R_{10}'$, or —Si(O$R_{10}'$)$_w$($R_{10}'$)$_t$, wherein each $R_{10}'$ independently is hydrogen, linear or branched $C_1$-$C_{10}$ alkyl, linear or branched $C_1$-$C_{10}$ haloalkyl, linear or branched $C_1$-$C_{10}$ perhaloalkyl, aryl, heteroaryl, phenyl($C_1$-$C_{10}$)alkyl, mono($C_1$-$C_{10}$)alkyl substituted phenyl($C_1$-$C_{10}$)alkyl, mono($C_1$-$C_{10}$)alkoxy substituted phenyl($C_1$-$C_{10}$)alkyl, ($C_1$-$C_{10}$)alkoxy($C_2$-$C_{10}$)alkyl, $C_3$-$C_7$ cycloalkyl, mono($C_1$-$C_{10}$)alkyl substituted $C_3$-$C_7$ cycloalkyl, or $C_3$-$C_7$ heterocycloalkyl, and w and t are each independently 0 to 3, provided that w+t is 3;
  (iii) —N($R_{11}'$)$R_{12}'$, wherein $R_{11}'$ and $R_{12}'$ are each independently hydrogen, linear or branched $C_1$-$C_{10}$ alkyl, $C_3$-$C_7$ cycloalkyl, and phenyl, or $R_{11}'$ and $R_{12}'$ come together with the nitrogen atom to form a ring; and
  (iv) the group $Y^2$; or
  (v) $R^3$ and $R^4$ together form a spiro substituent that is a substituted or unsubstituted spiro-carbocyclic ring containing 3 to 10 carbon atoms; and B and B' are each independently selected from the group consisting of unsubstituted aryl, substituted aryl, unsubstituted heteroaryl, substituted heteroaryl, alkenyl, and alkynyl, or B and B' taken together form a ring structure, wherein the aryl substituents and the heteroaryl substituents of B and B' each independently and optionally comprise a lengthening group $L^2$, wherein each lengthening group $L^1$ and $L^2$ is independently represented by the following Formula (III),

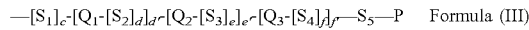

—[$S_1$]$_c$-[$Q_1$-[$S_2$]$_d$]$_{d'}$-[$Q_2$-[$S_3$]$_e$]$_{e'}$-[$Q_3$-[$S_4$]$_f$]$_{f'}$—$S_5$—P    Formula (III)

wherein:
(a) $Q_1$, $Q_2$, and $Q_3$ for each occurrence, are independently a divalent group selected from the group consisting of unsubstituted aryl, substituted aryl, unsubstituted heteroaryl, substituted heteroaryl, unsubstituted cycloalkyl, substituted cycloalkyl, unsubstituted heterocycloalky, and substituted heterocycloalkyl;
  wherein the aryl substituents, heteroaryl substituents, cycloalkyl substituents, and heterocycloalkyl substituents are each independently selected from the group consisting of P, liquid crystal mesogens, halogen, poly($C_1$-$C_{18}$ alkoxy), $C_1$-$C_{18}$ alkoxycarbonyl, $C_1$-$C_{18}$ alkylcarbonyl, $C_1$-$C_{18}$ alkoxycarbonyloxy, aryloxycarbonyloxy, perfluoro($C_1$-$C_{18}$)alkoxy, perfluoro($C_1$-$C_{18}$) alkoxycarbonyl, perfluoro($C_1$-$C_{18}$)alkylcarbonyl, perfluoro($C_1$-$C_{18}$)alkylamino, di-(perfluoro($C_1$-$C_{18}$)alkyl)amino, perfluoro($C_1$-$C_{18}$)alkylthio, $C_1$-$C_{18}$ alkylthio, $C_1$-$C_{18}$ acetyl, $C_3$-$C_{10}$ cycloalkyl, $C_3$-$C_{10}$ cycloalkoxy, straight-chain $C_1$-$C_{18}$ alkyl, and branched $C_1$-$C_{18}$ alkyl;
  wherein the straight-chain $C_1$-$C_{18}$ alkyl and branched $C_1$-$C_{18}$ alkyl are mono-substituted with a group selected from the group consisting of cyano, halogen, and $C_1$-$C_{18}$ alkoxy; or
  wherein the straight-chain $C_1$-$C_{18}$ alkyl and branched $C_1$-$C_{18}$ alkyl are poly-substituted with at least two groups independently selected from the group consisting of halogen, -M'(T)$_{(v-1)}$ and -M'(T)$_{(v-1)}$, wherein M' is chosen from aluminum, antimony, tantalum, titanium, zirconium and silicon, T is chosen from organofunctional radicals, organofunctional hydrocarbon radicals, aliphatic hydrocarbon radicals and aromatic hydrocarbon radicals, and v is the valence of M';
(b) c, d, e, and f are each independently chosen from an integer of 1 to 20; and each $S_1$, $S_2$, $S_3$, $S_4$, and $S_5$ is independently chosen for each occurrence from a spacer unit selected from the group consisting of:
  (i) alkylene, substituted alkylene, haloalkylene, substituted haloalkylene, —Si(CH$_2$)$_g$—, and —Si[(CH$_3$)$_2$]O)$_h$—, wherein g for each occurrence is independently chosen from an integer from 1 to 20; h for each occurrence is independently chosen from an integer from 1 to 16; and the substitutes for the alkylene and haloalkylene are independently selected from the group consisting of $C_1$-$C_{18}$ alkyl, $C_3$-$C_{10}$ cycloalkyl and aryl;
  (ii) —N(Z)—, —C(Z)=C(Z)—, —C(Z)=N—, —C(Z')$_2$—C(Z')$_2$—, —N(Z)—C(Z)$_2$—, and a single bond, wherein Z for each occurrence is independently selected from the group consisting of hydrogen, $C_1$-$C_{18}$ alkyl, $C_3$-$C_{10}$ cycloalkyl and aryl, and Z' for each occurrence is independently selected from the group consisting of $C_1$-$C_{18}$ alkyl, $C_3$-$C_{10}$ cycloalkyl and aryl; and
  (iii) —O—, —C(=O)—, —C≡C—, —N=N—, —S—, —S(=O)—, —(O=)S(=O)—, —(O=)S(=O)O—, —O(O=)S(=O)O— and straight-chain or branched $C_1$-$C_{24}$ alkylene residue, the $C_1$-$C_{24}$ alkylene residue being unsubstituted, mono-substituted by cyano or halogen, or poly-substituted by halogen,
  provided that when two spacer units comprising heteroatoms are linked together the spacer units are linked so that heteroatoms are not directly linked to each other, and the bond between $S_5$ and P is free of two heteroatoms linked to each other;
(c) P for each occurrence is independently selected from the group consisting of hydroxy, amino, $C_2$-$C_{18}$ alkenyl, $C_2$-$C_{18}$ alkynyl, azido, silyl, siloxy, silylhydride, (tetrahydro-2H-pyran-2-yl)oxy, thio, isocyanato, thioisocyanato, acryloyloxy, methacryloyloxy, 2-(acryloyloxy)ethylcarbamyl, 2-(methacryloyloxy)ethylcarbamyl, aziridinyl, allyloxycarbonyloxy, epoxy, carboxylic acid, carboxylic ester, acryloylamino, methacryloylamino, aminocarbonyl, $C_1$-$C_{18}$ alkyl aminocarbonyl, aminocarbonyl($C_1$-$C_{18}$)alkyl, $C_1$-$C_{18}$ alkyloxycarbonyloxy, halocarbonyl, hydrogen, aryl, hydroxy($C_1$-$C_{18}$)alkyl, $C_1$-$C_{18}$ alkyl, $C_1$-$C_{18}$ alkoxy, amino($C_1$-$C_{18}$)alkyl, $C_1$-$C_{18}$ alkylamino, di-($C_1$-$C_{18}$)alkylamino, $C_1$-$C_{18}$ alkyl($C_1$-$C_{18}$)alkoxy, $C_1$-$C_{18}$ alkoxy($C_1$-$C_{18}$) alkoxy, nitro, poly($C_1$-$C_{18}$)alkyl ether, ($C_1$-$C_{18}$)alkyl ($C_1$-$C_{18}$)alkoxy($C_1$-$C_{18}$)alkyl, polyethyleneoxy, polypropyleneoxy, ethylene, acryloyl, acryloyloxy($C_1$-$C_{18}$) alkyl, methacryloyl, methacryloyloxy($C_1$-$C_{18}$)alkyl, 2-chloroacryloyl, 2-phenylacryloyl, acryloyloxyphenyl, 2-chloroacryloylamino, 2-phenylacryloylaminocarbonyl, oxetanyl, glycidyl, cyano, isocyanato($C_1$-$C_{18}$)alkyl, itaconic acid ester, vinyl ether, vinyl ester, a styrene derivative, main-chain and side-chain liquid crystal polymers, siloxane derivatives, ethyleneimine derivatives, maleic acid derivatives, maleimide derivatives, fumaric acid derivatives, unsubstituted cinnamic acid derivatives, cinnamic acid derivatives that are substituted with at least one of methyl, methoxy, cyano and halogen, and substituted or unsubstituted chiral or non-chiral monovalent or divalent groups chosen from steroid radicals, terpenoid radicals, alkaloid radicals and mixtures thereof, wherein the substituents are independently chosen from $C_1$-$C_{18}$ alkyl, $C_1$-$C_{18}$ alkoxy, amino, $C_3$-$C_{10}$ cycloalkyl, $C_1$-$C_{18}$ alkyl($C_1$-$C_{18}$)alkoxy, fluoro($C_1$-$C_{18}$)alkyl, cyano, cyano($C_1$-$C_{18}$)alkyl, cyano ($C_1$-$C_{18}$)alkoxy or mixtures thereof, or P is a structure having from 2 to 4 reactive groups, or P is an unsubstituted or substituted ring opening metathesis polymerization precursor, or P is a substituted or unsubstituted photochromic compound; and (d) d', e' and f' are each independently chosen from 0, 1, 2, 3, and 4, provided that the sum of d'+e'+f' is at least 1; and wherein each group $Y^1$ and $Y^2$ independently comprises at least one residue of a ring-opened cyclic monomer, wherein each ring-opened cyclic monomer is independently selected from the group consisting of a ring-opened cyclic ester monomer and a ring-opened cyclic carbonate monomer.

Clause 5: The photochromic compound of clause 4 wherein, $R^1$ independently for each n, and $R^2$ independently for each m, are each independently selected from the group consisting of,
(1) hydrogen;
(2) cyano;
(3) the lengthening group $L^1$;
(4) halogen selected from the group consisting of fluoro, chloro, and bromo;
(5) linear or branched $C_1$-$C_{10}$ alkyl;
(6) linear or branched $C_1$-$C_{10}$ perhaloalkyl;
(7) substituted or unsubstituted $C_3$-$C_7$ cycloalkyl;
(8) —O—$R_{10}$';
(9) —S—$R_{10}$';
(10) the group $Y^1$;
(11) substituted or unsubstituted phenyl;
(12) substituted or unsubstituted heterocycloalkyl; and
(13) substituted or unsubstituted heteroaryl;

wherein each cycloalkyl substituent, each phenyl substituent, each heterocycloalkyl substituent, and each heteroaryl substituent, is in each case independently selected from the group consisting of at least one of hydroxyl, halogen, cyano, linear or branched $C_1$-$C_{10}$ alkyl, linear or branched $C_1$-$C_{10}$ haloalkyl, linear or branched $C_1$-$C_{10}$ perhaloalkyl, $C_3$-$C_7$ cycloalkyl, $C_3$-$C_7$ heterocycloalkyl, —O—$R_{10}$', —S—$R_{10}$', —C(O)—$R_{10}$', —C(O)—O$R_{10}$', and combinations thereof, where each $R_{10}$' is independently as described as follows;

wherein each $R_{10}$', of —O—$R_{10}$', —S—$R_{10}$', —C(O)—$R_{10}$', and —C(O)—O$R_{10}$', independently is hydrogen, linear or branched $C_1$-$C_{10}$ alkyl, linear or branched $C_1$-$C_{10}$ haloalkyl, linear or branched $C_1$-$C_{10}$ perhaloalkyl, phenyl, phenyl ($C_1$-$C_{10}$)alkyl, mono($C_1$-$C_{10}$)alkyl substituted phenyl($C_1$-$C_{10}$)alkyl, mono($C_1$-$C_{10}$)alkoxy substituted phenyl($C_1$-$C_{10}$)alkyl, ($C_1$-$C_{10}$)alkoxy($C_2$-$C_{10}$)alkyl, $C_3$-$C_7$ cycloalkyl, mono($C_1$-$C_{10}$)alkyl substituted $C_3$-$C_7$ cycloalkyl, or $C_3$-$C_7$ heterocycloalkyl;

$R^3$ and $R^4$ are each independently selected from the group consisting of, hydrogen; linear or branched $C_1$-$C_8$ alkyl; linear or branched $C_1$-$C_8$ haloalkyl; $C_3$-$C_6$ cycloalkyl; and the group $Y^2$; or $R^3$ and $R^4$ together form a spiro substituent that is a substituted or unsubstituted spiro-carbocyclic ring containing 3 to 10 carbon atoms; and B and B' are in each case independently selected from the group consisting of:
an aryl group that is mono-substituted with a reactive substituent; a substituted phenyl; a substituted aryl; a substituted 9-julolidinyl; a substituted heteroaromatic group chosen from pyridyl, furanyl, benzofuran-2-yl, benzofuran-3-yl, thienyl, benzothien-2-yl, benzothien-3-yl, dibenzofuranyl, dibenzothienyl, carbazoyl, benzopyridyl, indolinyl, and fluorenyl, wherein the phenyl, aryl, 9-julolidinyl, or heteroaromatic substituent is a reactive substituent R; an unsubstituted, mono-, di-, or tri-substituted phenyl or aryl group; 9-julolidinyl; or an unsubstituted, mono- or di-substituted heteroaromatic group chosen from pyridyl, furanyl, benzofuran-2-yl, benzofuran-3-yl, thienyl, benzothien-2-yl, benzothien-3-yl, dibenzofuranyl, dibenzothienyl, carbazoyl, benzopyridyl, indolinyl, and fluorenyl, wherein each of the phenyl, aryl and heteroaromatic substituents are each independently:

the lengthening group $L^2$;
hydroxyl, a group —C(=O)$R_{21}$, wherein $R_{21}$ is —O$R_{22}$, —N($R_{23}$)$R_{24}$, piperidino, or morpholino, wherein $R_{22}$ is allyl, linear or branched $C_1$-$C_{20}$ alkyl, phenyl, mono($C_1$-$C_{20}$)alkyl substituted phenyl, mono($C_1$-$C_{20}$)alkoxy substituted phenyl, phenyl($C_1$-$C_{20}$)alkyl, mono($C_1$-$C_{20}$)alkyl substituted phenyl($C_1$-$C_{20}$)alkyl, mono($C_1$-$C_{20}$)alkoxy substituted phenyl($C_1$-$C_{20}$)alkyl, $C_1$-$C_{20}$ alkoxy($C_2$-$C_{20}$)alkyl or $C_1$-$C_{20}$ haloalkyl, $R_{23}$ and $R_{24}$ are each independently $C_1$-$C_{20}$ alkyl, $C_5$-$C_{10}$ cycloalkyl, phenyl or substituted phenyl, the phenyl substituents being $C_1$-$C_{20}$ alkyl or $C_1$-$C_{20}$ alkoxy, and the halo substituent is chloro or fluoro, aryl, mono ($C_1$-$C_{20}$)alkoxyaryl, di($C_1$-$C_{20}$)alkoxyaryl, mono ($C_1$-$C_{20}$)alkylaryl, di($C_1$-$C_{20}$)alkylaryl, haloaryl, $C_3$-$C_{10}$ cycloalkylaryl, $C_3$-$C_{10}$ cycloalkyl, $C_3$-$C_{10}$ cycloalkyloxy, $C_3$-$C_{10}$ cycloalkyloxy($C_1$-$C_{20}$)alkyl, $C_3$-$C_{10}$ cycloalkyloxy($C_1$-$C_{20}$)alkoxy, aryl($C_1$-$C_{20}$)alkyl, aryl($C_1$-$C_{20}$)alkoxy, aryloxy, aryloxy($C_1$-$C_{20}$)alkyl, aryloxy($C_1$-$C_{20}$)alkoxy, mono- or di($C_1$-$C_{20}$)alkylaryl($C_1$-$C_{20}$)alkyl, mono- or di-($C_1$-$C_{20}$)alkoxyaryl($C_1$-$C_{20}$)alkyl, mono- or di-($C_1$-$C_{20}$)alkylaryl($C_1$-$C_{20}$)alkoxy, mono- or di-($C_1$-$C_{20}$)alkoxyaryl($C_1$-$C_{20}$)alkoxy, amino, mono- or di-($C_1$-$C_{20}$)alkylamino, diarylamino, piperazino, N—($C_1$-$C_{20}$)alkylpiperazino, N-arylpiperazino, aziridino, indolino, piperidino, morpholino, thiomorpholino, tetrahydroquinolino, tetrahydroisoquinolino, pyrrolidyl, $C_1$-$C_{20}$ alkyl, $C_1$-$C_{20}$ haloalkyl, $C_1$-$C_{20}$ alkoxy, mono($C_1$-$C_{20}$)alkoxy($C_1$-$C_{20}$)alkyl, acryloxy, methacryloxy, or halogen;

an unsubstituted or mono-substituted group chosen from pyrazolyl, imidazolyl, pyrazolinyl, imidazolinyl, pyrrolinyl, phenothiazinyl, phenoxazinyl, phenazinyl, and acridinyl, each of the substituents being $C_1$-$C_{20}$ alkyl, $C_1$-$C_{20}$ alkoxy, phenyl, or halogen;

a group represented by one of:

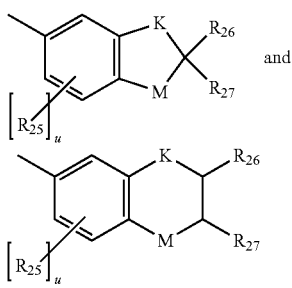

wherein K is —$CH_2$— or —O—, and M is —O— or substituted nitrogen, provided that when M is substituted nitrogen, K is —$CH_2$—, the substituted nitrogen substituents being hydrogen, $C_1$-$C_{20}$ alkyl, or $C_1$-$C_{20}$ acyl, each $R_{25}$ being independently chosen for each occurrence from $C_1$-$C_{20}$ alkyl, $C_1$-$C_{20}$ alkoxy, hydroxy, and halogen, $R_{26}$ and $R_{27}$ each being independently hydrogen or $C_1$-$C_{20}$ alkyl, and u is an integer ranging from 0 to 2; or a group represented by:

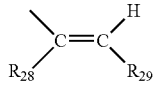

wherein $R_{28}$ is hydrogen or $C_1$-$C_{20}$ alkyl, and $R_{29}$ is an unsubstituted, mono-, or di-substituted group chosen from naphthyl, phenyl, furanyl, and thienyl, wherein the substituents are $C_1$-$C_{20}$ alkyl, $C_1$-$C_{20}$ alkoxy, or halogen; or B and B' taken together form one of a fluoren-9-ylidene, mono-, or di-substituted fluoren-9-ylidene, each of the fluoren-9-ylidene substituents being independently chosen from $C_1$-$C_{20}$ alkyl, $C_1$-$C_{20}$ alkoxy, and halogen;

wherein independently for each group $Y^1$ and $Y^2$, each cyclic ester monomer, of each ring-opened cyclic ester monomer, is independently represented by the following Formula (A),

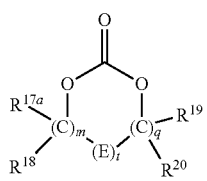

wherein for Formula (A), I and J are each independently integers ranging from 1 to 8; $R^{13}$, $R^{14}$, $R^{15a}$, and $R^{16a}$ are independently chosen for each carbon unit $(C)_I$ and $(C)_J$ from —H and $C_1$-$C_{16}$ alkyl; k is 0 or 1; and D is —O— when k is 1; and each cyclic carbonate monomer, of each ring-opened cyclic carbonate monomer, is independently represented by the following Formula (B), (B)

wherein for Formula (B), m and q are each independently integers ranging from 1 to 3; $R^{17a}$, $R^{18}$, $R^{19}$, and $R^{20}$ are each independently chosen for each carbon unit $(C)_m$ and $(C)_q$ from —H and $C_1$-$C_{16}$ alkyl; t is 0 or 1; and E is —O— when t is 1.

Clause 6: The photochromic compound of clauses 4 or 5 wherein, $R^1$ independently for each n, and $R^2$ independently for each m, are each independently selected from the group consisting of,
(1) hydrogen;
(2) cyano;
(3) the lengthening group $L^1$;
(4) linear or branched $C_1$-$C_6$ alkyl;
(5) substituted or unsubstituted $C_3$-$C_6$ cycloalkyl;
(6) linear or branched $C_1$-$C_8$ perhaloalkyl;
(7) fluoro;
(8) chloro;
(9) bromo,
(10) —O—$R_{10}$';
(11) —S—$R_{10}$';
(12) the group $Y^1$;
(13) substituted or unsubstituted phenyl;
(14) substituted or unsubstituted heterocycloalkyl; and
(15) substituted or unsubstituted heteroaryl;

wherein each cycloalkyl substituent, each phenyl substituent, each heterocycloalkyl substituent, and each heteroaryl substituent, is in each case independently selected from the group consisting of at least one of hydroxyl, halogen, cyano, linear or branched $C_1$-$C_6$ alkyl, linear or branched $C_1$-$C_6$ haloalkyl, linear or branched $C_1$-$C_6$ perhaloalkyl, —O—$R_{10}$', —S—$R_{10}$', —C(O)—$R_{10}$', —C(O)—$OR_{10}$', and combinations thereof, where each $R_{10}$' is independently as described as follows;

wherein each $R_{10}$', of —O—$R_{10}$', —S—$R_{10}$', —C(O)—$R_{10}$', and —C(O)—$OR_{10}$', independently is hydrogen, linear or branched $C_1$-$C_6$ alkyl, linear or branched $C_1$-$C_6$ haloalkyl, linear or branched $C_1$-$C_6$ perhaloalkyl, phenyl, phenyl($C_1$-$C_6$)alkyl, mono($C_1$-$C_6$)alkyl substituted phenyl ($C_1$-$C_6$)alkyl, mono($C_1$-$C_6$)alkoxy substituted phenyl($C_1$-$C_6$)alkyl, ($C_1$-$C_6$)alkoxy($C_2$-$C_6$)alkyl, $C_3$-$C_6$ cycloalkyl, mono($C_1$-$C_6$)alkyl substituted $C_3$-$C_6$ cycloalkyl, or $C_3$-$C_6$ heterocycloalkyl;

$R^3$ and $R^4$ are each independently selected from the group consisting of, hydrogen; linear or branched $C_1$-$C_8$ alkyl; linear or branched $C_1$-$C_8$ haloalkyl; $C_3$-$C_6$ cycloalkyl; and the group $Y^2$; and B and B' are in each case independently selected from the group consisting of, unsubstituted aryl,
  aryl substituted with linear or branched $C_1$-$C_6$ alkoxy,
  aryl substituted with linear or branched $C_1$-$C_6$ perhaloalkyl,
  aryl substituted with morpholino, and
  aryl substituted with piperidino, wherein independently for each group $Y^1$ and $Y^2$, each cyclic ester monomer, of each ring-opened cyclic ester monomer, is independently selected from the group consisting of, ε(epsilon)-caprolactone; t-butyl caprolactone; ζ(zeta)-enantholactone; δ(delta)-valerolactone; a monoalkyl δ(delta)-valerolactone; a monoalkyl-, dialkyl-, or trialkyl-ε(epsilon)-caprolactone; β(beta)-lactones; γ(gamma)-lactones; dilactones; and 1,4-dioxan-2-one; and each cyclic carbonate monomer, of each ring-opened cyclic carbonate monomer, is independently selected from the group consisting of, ethylene carbonate; 3-ethyl-3-hydroxylmethyl trimethylene carbonate; propylene carbonate, trimethylene carbonate; trimethylolpropane monocarbonate; 4,6-dimethyl-1,3-propylene carbonate; 2,2-dimethyl trimethylene carbonate; and 1,3-dioxepan-2-one.

Clause 7: The photochromic compound of clauses 4, 5, or 6 wherein, at least one of $R^1$ and $R^2$ is independently the lengthening group $L^1$.

Clause 8: The photochromic compound of clauses 4, 5, 6, or 7 wherein, independently for each lengthening group $L^1$ and $L^2$ represented by Formula (III),
(a) $Q_1$, $Q_2$, and $Q_3$ for each occurrence, are independently selected from the group consisting of unsubstituted aryl, substituted aryl, unsubstituted cycloalkyl, and substituted cycloalkyl,
(b) each $S_1$, $S_2$, $S_3$, $S_4$, and $S_5$ is independently chosen for each occurrence from a spacer unit selected from the group consisting of,
  (ii) —N(Z)—, —C(Z)=C(Z)—, —C(Z)=N—, —C(Z')$_2$—C(Z')$_2$—, —N(Z)—C(Z')$_2$—, and a single bond, wherein Z for each occurrence is independently selected from the group consisting of hydrogen, $C_1$-$C_8$ alkyl, $C_3$-$C_6$ cycloalkyl and aryl, and Z' for each occurrence is independently selected from the group consisting of $C_1$-$C_8$ alkyl, $C_3$-$C_6$ cycloalkyl and aryl, and
  (iii) —O—, —C(=O)—, —C≡C—, —N=N—, —S—, —S(=O)—, and straight-chain or branched $C_1$-$C_{12}$ alkylene residue, the $C_1$-$C_{12}$ alkylene residue being unsubstituted, mono-substituted by cyano or halogen, or poly-substituted by halogen, and
(c) P for each occurrence is independently selected from the group consisting of hydrogen, hydroxy, amino, $C_2$-$C_8$ alkenyl, $C_2$-$C_8$ alkynyl, acryloyloxy, methacryloyloxy, 2-(acryloyloxy)ethylcarbamyl, 2-(methacryloyloxy)ethylcarbamyl, epoxy, carboxylic acid, carboxylic ester, acryloylamino, methacryloylamino, aminocarbonyl, $C_1$-$C_8$ alkyl aminocarbonyl, aminocarbonyl($C_1$-$C_8$)alkyl, $C_1$-$C_8$ alkyloxycarbonyloxy, halocarbonyl, aryl, hydroxy($C_1$-$C_8$)alkyl, $C_1$-$C_8$ alkyl, $C_1$-$C_8$ alkoxy, amino($C_1$-$C_8$)alkyl, $C_1$-$C_8$ alkylamino, di-($C_1$-$C_8$)alkylamino, $C_1$-$C_8$ alkyl($C_1$-$C_8$)alkoxy, $C_1$-$C_8$ alkoxy($C_1$-$C_8$)alkoxy, nitro, poly($C_1$-$C_8$)alkyl ether, ($C_1$-$C_8$)alkyl($C_1$-$C_8$)alkoxy($C_1$-$C_8$)alkyl, polyethyleneoxy, polypropyleneoxy, ethylene, acryloyl, acryloyloxy($C_1$-$C_{18}$)alkyl, methacryloyl, methacryloyloxy($C_1$-$C_8$)alkyl, 2-chloroacryloyl, 2-phenylacryloyl, acryloyloxyphenyl, 2-chloroacryloylamino, 2-phenylacryloylaminocarbonyl, oxetanyl, glycidyl, cyano, isocyanato($C_1$-$C_{18}$)alkyl, itaconic acid ester, vinyl ether, and vinyl ester.

Clause 9: The photochromic compound of clauses 4, 5, 6, 7, or 8 wherein,
independently for each lengthening group $L^1$ and $L^2$ represented by Formula (III),
(b) each $S_1$, $S_2$, $S_3$, $S_4$, and $S_5$ is independently chosen for each occurrence from a spacer unit selected from the group consisting of,
  (ii) —N(Z)—, —C(Z)=C(Z)—, and a single bond, wherein Z for each occurrence is independently selected from the group consisting of hydrogen, $C_1$-$C_8$ alkyl, $C_3$-$C_6$ cycloalkyl and aryl, and Z' for each occurrence is independently selected from the group consisting of $C_1$-$C_8$ alkyl, $C_3$-$C_6$ cycloalkyl and aryl, and
  (iii) —O—, —C(=O)—, —C≡C—, and straight-chain or branched $C_1$-$C_6$ alkylene residue, the $C_1$-$C_6$ alkylene residue being unsubstituted, mono-substituted by cyano or halogen, or poly-substituted by halogen, and
(c) P for each occurrence is independently selected from the group consisting of hydrogen, hydroxy, amino, $C_2$-$C_8$ alkenyl, $C_2$-$C_8$ alkynyl, and aryl.

Clause 10: A photochromic compound represented by the following Formula (IV), $$L^y\text{-}(PC)_{n'} \quad \text{Formula (IV)}$$

wherein,
n' is at least 2,
PC independently for each n' is a residue of the photochromic compound of clauses 1, 2, 3, 4, 5, 6, 7, 8, or 9 and
$L^y$ is a multivalent linking group selected from the group consisting of,
  a first multivalent compound that is a multivalent polymer, and
  a second multivalent compound that is different than the first multivalent compound, the second multivalent compound being non-polymeric and comprising a residue selected from the group consisting of, a residue of a polyisocyanate, a residue of a polyol, a residue of a polycarboxylic acid, a residue of a polycarbonate functional material, and combinations thereof.

Clause 11: The photochromic compound of clause 10 wherein,
the multivalent polymer, of the first multivalent compound, is selected from the group consisting of multivalent polyurethane, multivalent polyester, multivalent polyether, multivalent poly(meth)acrylate, multivalent polyvinylalcohol, multivalent polycarbonate, multivalent polysiloxane, and multivalent cyclic polysiloxane, and for the second multivalent compound,
the polyisocyanate is selected from the group consisting of aliphatic polyisocyanates, cycloaliphatic polyisocyanates, heterocyclic polyisocyanates, and aromatic polyisocyanates, each independently having at least two isocyanate groups, dimers thereof, trimers thereof, and mixtures of one or more thereof,
the polyol is selected from the group consisting of aliphatic polyols, cycloaliphatic polyols, heterocyclic polyols, and aromatic polyols, each independently having at least two hydroxyl groups,
the polycarboxylic acid is selected from the group consisting of aliphatic polycarboxylic acids, cycloaliphatic polycarboxylic acids, heterocyclic polycarboxylic acids, and aromatic polycarboxylic acids, each independently having at least two carboxylic acid groups, and
the polycarbonate functional material is selected from the group consisting of aliphatic polycarbonate functional compounds, cycloaliphatic polycarbonate functional compounds, heterocyclic polycarbonate functional compounds, and aromatic polycarbonate functional compounds, each independently having at least two cyclic carbonate groups.

Clause 12: A photochromic composition comprising the photochromic compound of clauses 1, 2, 3, 4, 5, 6, 7, 8, or 9.

Clause 13: A photochromic article comprising the photochromic compound of clauses 1, 2, 3, 4, 5, 6, 7, 8, or 9, wherein the photochromic article is selected from the group consisting of ophthalmic articles, display articles, windows, mirrors, active liquid crystal cell articles, and passive liquid crystal cell articles.

Clause 14: The photochromic article of clause 13, wherein the photochromic article is selected from ophthalmic articles, and the ophthalmic articles are selected from the group consisting of corrective lenses, non-corrective lenses, contact lenses, intra-ocular lenses, magnifying lenses, protective lenses, and visors.

Clause 15: The photochromic article of clause 13, wherein the photochromic article is selected from display articles, and the display articles are selected from the group consisting of screens, monitors, and security elements.

The present invention has been described with reference to specific details of particular embodiments thereof. It is not intended that such details be regarded as limitations upon the scope of the invention except insofar as to the extent that they are included in the accompanying claims.

What is claimed is:

1. A photochromic compound represented by the following Formula (IIb),

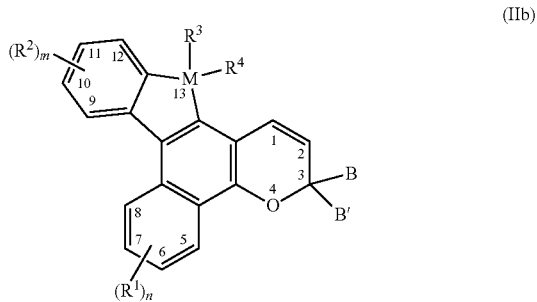

(IIb)

wherein, $R^1$ independently for each n, and $R^2$ independently for each m, are selected from the group consisting of, hydrogen;

linear or branched $C_1$-$C_6$ alkyl;

substituted or unsubstituted $C_3$-$C_6$ cycloalkyl;

linear or branched $C_1$-$C_8$ perhaloalkyl;

—O—$R_{10}$', and substituted or unsubstituted phenyl;

wherein each cycloalkyl substituent, and each phenyl substituent, is independently selected from the group consisting of at least one of linear or branched $C_1$-$C_6$ alkyl, —O—$R_{10}$', and combinations thereof, where each $R_{10}$' is independently as described as follows;

wherein each $R_{10}$', of —O—$R_{10}$', is hydrogen, or linear or branched $C_1$-$C_6$ alkyl;

M is Si or Ge;

$R^3$ and $R^4$ are each independently selected from the group consisting of, hydrogen; and linear or branched $C_1$-$C_8$ alkyl; and B and B' are in each case independently selected from the group consisting of, unsubstituted phenyl, phenyl substituted with linear or branched $C_1$-$C_6$ alkoxy, phenyl substituted with linear or branched $C_1$-$C_6$ perhaloalkyl, phenyl substituted with morpholino, and phenyl substituted with piperidino.

2. A photochromic composition comprising the photochromic compound of claim 1.

3. A photochromic article comprising the photochromic compound of claim 1, wherein the photochromic article is selected from the group consisting of ophthalmic articles, display articles, windows, mirrors, active liquid crystal cell articles, and passive liquid crystal cell articles.

4. The photochromic article of claim 3, wherein the photochromic article is selected from ophthalmic articles, and the ophthalmic articles are selected from the group consisting of corrective lenses, non-corrective lenses, contact lenses, intra-ocular lenses, magnifying lenses, protective lenses, and visors.

5. The photochromic article of claim 3, wherein the photochromic article is selected from display articles, and the display articles are selected from the group consisting of screens, monitors, and security elements.

* * * * *